(12) United States Patent
Yang et al.

(10) Patent No.: US 11,166,297 B2
(45) Date of Patent: Nov. 2, 2021

(54) TRANSMISSION RESOURCE DETERMINING METHOD AND DEVICE, USER EQUIPMENT AND STORAGE MEDIUM

(71) Applicant: ZTE CORPORATION, Guangdong (CN)

(72) Inventors: Xun Yang, Guangdong (CN); Weimin Li, Guangdong (CN); Bo Dai, Guangdong (CN); Zhifeng Yuan, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 226 days.

(21) Appl. No.: 16/497,205

(22) PCT Filed: Mar. 26, 2018

(86) PCT No.: PCT/CN2018/080497
§ 371 (c)(1),
(2) Date: Sep. 24, 2019

(87) PCT Pub. No.: WO2018/171798
PCT Pub. Date: Sep. 27, 2018

(65) Prior Publication Data
US 2020/0022162 A1  Jan. 16, 2020

(30) Foreign Application Priority Data
Mar. 24, 2017 (CN) .......................... 201710183865.X

(51) Int. Cl.
*H04W 72/12* (2009.01)
*H04B 1/713* (2011.01)

(52) U.S. Cl.
CPC ........ *H04W 72/1257* (2013.01); *H04B 1/713* (2013.01); *H04W 72/121* (2013.01)

(58) Field of Classification Search
CPC .................................................. H04W 72/1257
See application file for complete search history.

(56) References Cited

U.S. PATENT DOCUMENTS 7,526,035 B2 * 4/2009 Suh ..................... H04L 1/0001
                                                            375/132
8,917,687 B2 * 12/2014 Shi ......................... H04L 5/005
                                                            370/329

(Continued)

FOREIGN PATENT DOCUMENTS

| CN | 102315921 A | 1/2012 |
| CN | 103228057 A | 7/2013 |
| CN | 103944665 A | 7/2014 |

OTHER PUBLICATIONS

WIPO, International Search Report dated May 17, 2018.
Final Report of 3GPP TSG RAN WG1 #78 v1.1.0 (Dresden, Germany, Aug. 18-22, 2014).

*Primary Examiner* — Parth Patel
(74) *Attorney, Agent, or Firm* — Li & Cai Intellectual Property (USA) Office

(57) ABSTRACT

The present disclosure discloses a transmission resource determining method and device, a user equipment, and a storage medium. The method includes: deriving, by a user equipment, a hopping rule of a used transmission resource, wherein in the hopping rule, the transmission resource used after a current hopping is associated with identification information used in the latest transmission, and is associated with at least one of: frequency domain information corresponding to a physical resource used in the latest transmission, and time domain information of the latest transmission, wherein the identification information is used to distinguish a plurality of user equipments using the same resource for information transmission; and performing, by the user (Continued)

equipment, a corresponding transmission resource hopping at a preset time interval according to the hopping rule.

20 Claims, 5 Drawing Sheets

(56) References Cited

U.S. PATENT DOCUMENTS

| | | | | |
|---|---|---|---|---|
| 9,628,140 B2* | 4/2017 | Xie | ............ | H04B 1/7143 |
| 2003/0108008 A1 | 6/2003 | Agrawal | | |
| 2007/0263702 A1* | 11/2007 | Kwon | ............ | H04B 1/7143 |
| | | | | 375/135 |
| 2010/0284363 A1* | 11/2010 | Ahn | ............ | H04B 7/12 |
| | | | | 370/330 |
| 2011/0007778 A1* | 1/2011 | Kishiyama | ............ | H04L 5/0048 |
| | | | | 375/133 |
| 2011/0026564 A1* | 2/2011 | Arvidsson | ............ | H04L 5/0094 |
| | | | | 375/133 |
| 2011/0124347 A1* | 5/2011 | Chen | ............ | H04W 64/00 |
| | | | | 455/456.1 |
| 2011/0267972 A1* | 11/2011 | Yoon | ............ | H04L 27/2607 |
| | | | | 370/252 |
| 2011/0294529 A1* | 12/2011 | Luo | ............ | H04L 5/0035 |
| | | | | 455/509 |
| 2012/0033587 A1* | 2/2012 | Papasakellariou | ............ | |
| | | | | H04L 27/2636 |
| | | | | 370/277 |
| 2013/0028138 A1* | 1/2013 | Hao | ............ | H04L 5/0092 |
| | | | | 370/254 |
| 2013/0070725 A1* | 3/2013 | Wang | ............ | H04W 72/044 |
| | | | | 370/330 |
| 2013/0148592 A1* | 6/2013 | Noh | ............ | H04W 72/0446 |
| | | | | 370/329 |
| 2013/0170441 A1* | 7/2013 | Sorrentino | ............ | H04L 5/0048 |
| | | | | 370/329 |
| 2013/0242911 A1* | 9/2013 | Heo | ............ | H04L 5/0048 |
| | | | | 370/329 |
| 2014/0177490 A1* | 6/2014 | Sahara | ............ | H04L 5/0044 |
| | | | | 370/280 |
| 2014/0211735 A1* | 7/2014 | Nanri | ............ | H04L 1/20 |
| | | | | 370/329 |
| 2015/0373626 A1* | 12/2015 | Yi | ............ | H04W 24/08 |
| | | | | 375/132 |
| 2015/0373721 A1* | 12/2015 | Zhang | ............ | H04W 72/0413 |
| | | | | 370/329 |
| 2016/0344518 A1* | 11/2016 | Brunel | ............ | H04W 16/14 |
| 2017/0134881 A1* | 5/2017 | Oh | ............ | H04W 56/001 |
| 2017/0223743 A1* | 8/2017 | Lin | ............ | H04L 27/2607 |
| 2017/0303275 A1* | 10/2017 | Banerjea | ............ | H04W 72/0446 |
| 2018/0035242 A1* | 2/2018 | Yi | ............ | H04L 5/0064 |
| 2018/0035424 A1* | 2/2018 | Sun | ............ | H04L 5/0094 |
| 2018/0049097 A1* | 2/2018 | Chen | ............ | H04W 40/12 |
| 2018/0076946 A1* | 3/2018 | Li | ............ | H04L 5/0091 |
| 2018/0092101 A1* | 3/2018 | Xia | ............ | H04W 72/04 |
| 2018/0213513 A1* | 7/2018 | Sun | ............ | H04L 27/2649 |
| 2018/0270807 A1* | 9/2018 | Salem | ............ | H04L 5/0048 |
| 2019/0013903 A1* | 1/2019 | Zhang | ............ | H04W 72/0453 |
| 2019/0028143 A1* | 1/2019 | Zhang | ............ | H04W 72/042 |
| 2019/0081688 A1* | 3/2019 | Deenoo | ............ | H04B 7/088 |
| 2019/0159216 A1* | 5/2019 | Sun | ............ | H04L 1/1614 |
| 2020/0014515 A1* | 1/2020 | Qin | ............ | H04L 27/2613 |
| 2020/0022162 A1* | 1/2020 | Yang | ............ | H04B 1/7143 |
| 2020/0059286 A1* | 2/2020 | Xiong | ............ | H04B 7/0857 |

* cited by examiner

Fig. 1 deriving, by a user equipment, a hopping rule of a used transmission resource, wherein in the hopping rule, the transmission resource used after a current hopping is associated with at least two of: frequency domain information corresponding to a physical resource used in the latest transmission, time domain information of the latest transmission, and identification information used in the latest transmission, and the identification information is used to distinguish a plurality of user equipments using the same frequency domain resource for information transmission ~ S11 performing, by the user equipment, a corresponding transmission resource hopping at a preset time interval according to the hopping rule ~ S12

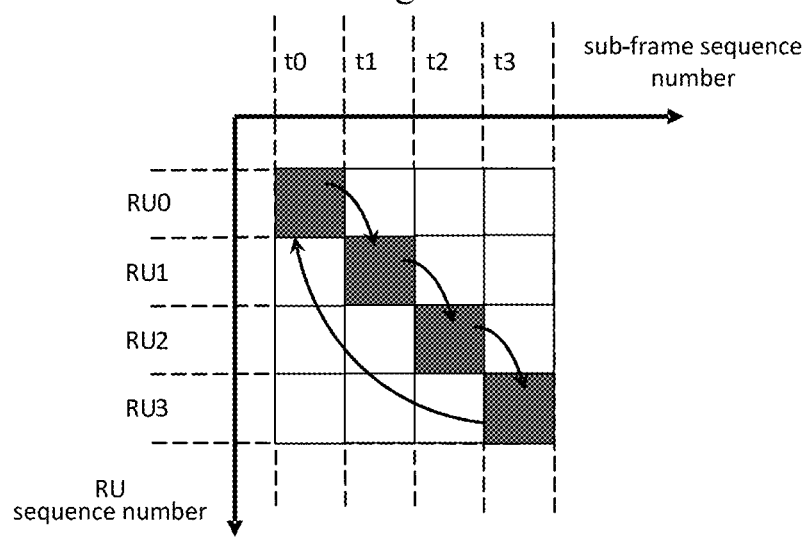

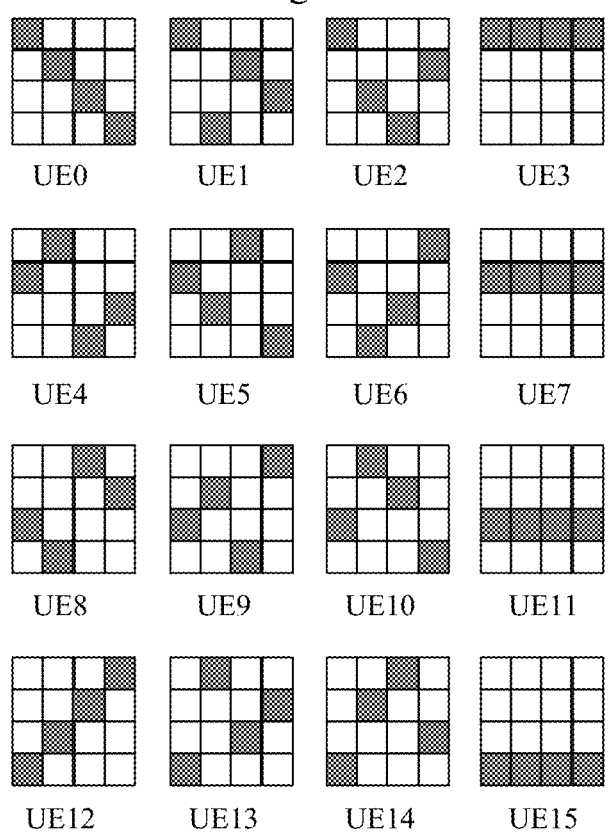

TRANSMISSION RESOURCE DETERMINING METHOD AND DEVICE, USER EQUIPMENT AND STORAGE MEDIUM

CROSS REFERENCE TO RELATED APPLICATION

This application is a National Phase application filed under 35 U.S.C. 371 as a national stage of PCT/CN2018/080497, filed on Mar. 26, 2018, an application claiming the priority of the Chinese patent application No. 201710183865.X, filed on Mar. 24, 2017, the contents of which are incorporated herein by reference in their entirety.

TECHNICAL FIELD

The present disclosure relates to the technical field of communication, and in particular, to a transmission resource determining method and device, a user equipment, and a storage medium.

BACKGROUND

In a 5G ($5^{th}$ Generation) network scenario, there may be a user equipment accessing a base station at any time. Since a channel may be a frequency-selective fading channel, a user equipment that has been scheduled at a frequency deep fading position may be unable to establish a contact with a base station side in a longer time period, resulting in communication failure. For this problem, it is necessary to periodically adjust a frequency position of a single user to be scheduled for a time period so as to enable, in statistical meaning, the single user to jump out of a bad condition in which the single user is located in a long-term deep fading channel. The method for adjusting the frequency position of a communication between the user equipment and the base station side is called as frequency hopping. The frequency hopping can not only effectively improve channel for the user equipment located in the long-term deep fading, but also improve communication performance of the user equipment, even for the user equipment that is already in a good channel condition, by increasing a frequency domain diversity of the user equipment.

In addition, it is inevitable that the same frequency resource block is allocated to a plurality of user equipments for signal sharing due to limitation of a frequency domain resource. That is, signals of the plurality of user equipments collide on the same frequency domain resource block. Although the signals of the plurality of user equipments scheduled on the same frequency resource block can be demodulated by a code division technology or power division technology, demodulation effect is seriously affected by different signal-to-noise ratios of the signals of the plurality of user equipments and different collision relationships of the user equipments in combined transmission. For example, when user equipment signals having the same signal-to-noise ratio are transmitted on the same resource block, the demodulation effect is relatively poor. The user equipment signals having obviously different signal-to-noise ratios are transmitted on the same resource block, these signals can be relatively effectively demodulated by technical methods such as SIC (Successive Interference Cancellation).

In view of the above problems, the frequency hopping can periodically adjust frequency domain resources of all of accessed user equipments to periodically adjust the collision relationship of the user equipment signals. Thus, a receiver at the base station side has an opportunity to effectively demodulate the signals based on a more suitable combined collision relationship of the user equipments.

However, in the related art, there is no effective solution that can effectively schedule the plurality of user equipments to ergodically schedule the signal transmission of the user equipment on the frequency domain resources and to realize ergodicity of the collision relationships between the plurality of user equipments.

SUMMARY

A technical problem to be solved by the present disclosure is to provide a transmission resource determining method and device, a user equipment, and a storage medium, so as to solve the problem that a plurality of user equipments cannot be effectively allocated in the related art.

In one aspect, the present disclosure provides a transmission resource determining method, including: deriving, by a user equipment, a hopping rule of a used transmission resource, wherein in the hopping rule, the transmission resource used after a current hopping is associated with at least two of: frequency domain information corresponding to a physical resource used in the latest transmission, time domain information of the latest transmission, and identification information used in the latest transmission, and the identification information is used to distinguish a plurality of user equipments using the same resource for information transmission; and performing, by the user equipment, a corresponding transmission resource hopping at a preset time interval according to the hopping rule.

In another aspect, the present disclosure further provides a transmission resource determining device, including: a deriving unit configured to enable a user equipment to derive a hopping rule of a used transmission resource, wherein in the hopping rule, the transmission resource used after a current hopping is associated with at least two of: frequency domain information corresponding to a physical resource used in the latest transmission, time domain information of the latest transmission, and identification information used in the latest transmission, and the identification information is configured to distinguish a plurality of user equipments using the same resource for information transmission; and a hopping unit configured to enable the user equipment to perform a corresponding transmission resource hopping at a preset time interval according to the hopping rule.

In yet another aspect, the present disclosure provides user equipment, including a processor for processing data, and a memory configured to store data, wherein the memory is configured to store an instruction for implementing a transmission resource determining method; and the processor is configured to execute the instruction stored in the memory. When the processor executes the instruction stored in the memory, executing steps including: acquiring a hopping rule of a used transmission resource, wherein in the hopping rule, the transmission resource used after a current hopping is associated with at least two of: frequency domain information corresponding to a physical resource used in the latest transmission, time domain information of the latest transmission, and identification information used in the latest transmission, and the identification information is used to distinguish a plurality of user equipments using the same resource for information transmission; and performing a corresponding transmission resource hopping at a preset time interval according to the hopping rule.

In still another aspect, an embodiment of the present disclosure provides a storage medium in which a computer-executable instruction is stored, wherein the computer-executable instruction is used to execute the above transmission resource determining method.

According to the transmission resource determining method and device, the user equipment and the storage medium provided by the embodiments of the present disclosure, which transmission resource each of the user equipments jumps to is only related to the frequency domain resource, the time domain resource or the identification resource used before the hopping. Thus, a collision probability when the plurality of user equipments perform resource hopping is effectively reduced, and the user equipment signals having obviously different signal-to-noise ratios can be transmitted on the same resource block more easily. A collision relationship of the user equipment signals is periodically adjusted by periodically adjusting frequency domain resources of all of accessed user equipments, so that a receiver at a base station side has an opportunity to effectively demodulate the signals based on a more suitable combined collision relationship of the user equipments.

BRIEF DESCRIPTION OF DRAWINGS

FIG. 1 is a flowchart of a transmission resource determining method provided by an embodiment of the present disclosure;

FIG. 2 is a schematic diagram of a frequency hopping pattern of a user equipment according to an embodiment of the present disclosure;

FIG. 3 is another schematic diagram of the frequency hopping pattern of the user equipment according to an embodiment of the present disclosure;

DETAILED DESCRIPTION

Figure 4:
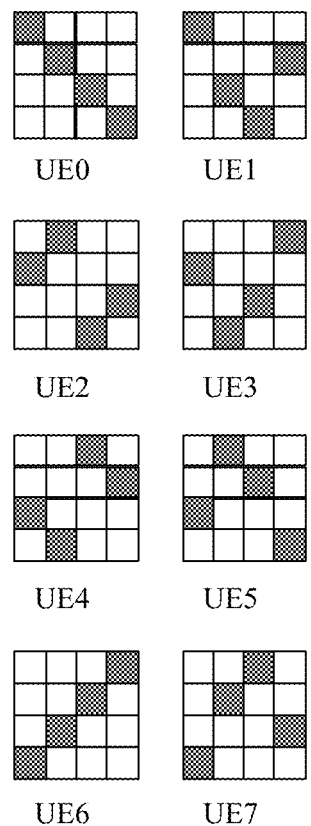
FIG. 4 is yet another schematic diagram of the frequency hopping pattern of the user equipment according to an embodiment of the present disclosure.

The present disclosure will be described in detail below with reference to the accompanying drawings. It should be understood that the specific embodiments described herein are merely illustrative of the present disclosure and are not intended to limit the present disclosure.

As shown in FIG. 1, an embodiment of the present disclosure provides a transmission resource determining method, which includes the following steps S11 to S12.

In step S11, a user equipment derives a hopping rule of a used transmission resource, wherein in the hopping rule, the transmission resource used after a current hopping is associated with at least two of: frequency domain information corresponding to a physical resource used in the latest transmission, time domain information of the latest transmission, and identification information used in the latest transmission; and the identification information is used to distinguish a plurality of user equipments using the same resource for information transmission.

In step S12, the user equipment performs a corresponding transmission resource hopping at a preset time interval according to the hopping rule.

In the transmission resource determining method provided by the embodiment of the present disclosure, which transmission resource each of the user equipments jumps to is only related to the frequency domain resource, the time domain resource or the identification resource used before the hopping. Thus, a collision probability when the plurality of user equipments perform resource hopping is effectively reduced, and the user equipment signals having obviously different signal-to-noise ratios can be transmitted on the same resource block more easily. A collision relationship of the user equipment signals is periodically adjusted by periodically adjusting frequency domain resources of all of accessed user equipments, so that a receiver at a base station side has an opportunity to effectively demodulate the signals based on a more suitable combined collision relationship of the user equipment.

In an implementation, each of the user equipments can determine a hopping rule of the transmission resource with a base station that the user equipment corresponds to. After both the user equipment and the base station derive the corresponding hopping rule, the user equipment can perform transmission resource hopping according to the corresponding rule.

Here, the frequency domain information corresponding to the physical resource used in the latest transmission may include a resource unit (RU) sequence number used in the previous transmission. The time domain information of the latest transmission may include a sub-frame sequence number used for transmission in the latest transmission, or a time slot sequence number at the latest transmission, or a symbol sequence number at the latest transmission, or the number of resource hopping times. The identification information used in the latest transmission may include sequence coding information or power intensity information used in the latest transmission. The sequence coding information may include pilot sequence information and/or spreading sequence information.

Here, the hopping rule may include one or more of following rules: a function based hopping rule, an orthogonal Latin square based hopping rule, and a Latin square based hopping rule.

It is assumed that in a communication system, there are N RUs, including $RU_0, RU_1, \ldots,$ and $RU_{N-1}$ can be scheduled, M UEs are scheduled on the N RUs, and each of the scheduled $UE_0, UE_1, \ldots,$ and $UE_{M-1}$ performs frequency hopping every $\Delta t$ time.

As shown in FIG. 2, for the function based hopping rule, a scheduled $UE_k$ is scheduled on a RU $y_{k,r-1}$ at t, and the value of a parameter X is $x_{k,r-1}$. Then, after performing the r-th frequency hopping at $t+\Delta t$, the $UE_k$ is scheduled on RU $y_{k,r}$, and the value of the parameter X is $x_{k,r}$.

For the $UE_k$, the sequence number $y_{k,r}$ of the RU is determined by $y_{k,r-1}, x_{k,r-1}$ and r before the r-th frequency hopping. The function based hopping rule can be expressed by the following equation:

$$y_{k,r}=F(y_{k,r-1},x_{k,r-1},r) \quad (1).$$

For any $UE_k$, the parameter $x_{k,r}$ can be a variable determined by $y_{k,r-1}, x_{k,r-1}$ and r. This can be expressed as the following equation:

$$x_{k,r}=G(y_{k,r-1},x_{k,r-1},r) \quad (2).$$

Where k is a sequence number of the user equipment (UE), r is a positive integer greater than or equal to 1, and $y_{k,r}$ is a sequence number of a frequency domain resource to which the $UE_k$ jumps for the r-th time; $x_{k,r}$ is a sequence number of identification information after the $UE_k$ jumps for the r-th time; $y_{k,0}$ indicates a sequence number of a frequency domain resource initially used by the $UE_k$; and $x_{k,0}$ is a sequence number of identification information initially used by the $UE_k$. That is, $y_{k,r}$ is the sequence number of the frequency domain resource to which the scheduled $UE_k$ jumps for the r-th time; $y_{k,r-1}$ is the sequence number of a frequency domain resource to which the $UE_k$ jumps for the (r−1)-th time; $x_{k,r}$, is the sequence number of the identification information after the user equipment $UE_k$ jumps for the r-th time; and $x_{k,r-1}$ is a sequence number of identification information after the $UE_k$ jumps for the (r−1)-th time.

In the embodiments of the present disclosure, the function F and the function G may be in various forms as long as the corresponding frequency domain resource hopping can be implemented, which are not limited by the embodiments of the present disclosure. For example, in an embodiment of the present disclosure, $F(y_{k,r-1},x_{k,r-1},r)$ may be a modulo function; and $G(y_{k,r-1},x_{k,r-1},r)$ may be a modulo function or a constant. For example, in another embodiment of the present disclosure, specific definitions of the functions G and F can be as follows:

$$x_{k,r}=\mod(x_{k,r-1}+\Delta x_{k,r},M) \text{ or } x_{k,r}=x_{k,r-1} \quad (3); \text{ and}$$

$$y_{k,r}=\mod(y_{k,r-1}+\Delta y_{k,r},N) \quad (4).$$

Where the operator mod represents a modulo operation; $x_{k,r}$ is obtained by performing, by $x_{k,r-1}+x_{k,r}$, the modulo operation on M, or is equal to $x_{k,r-1}$; $y_{k,r}$ is obtained by performing, by $y_{k,r-1}+\Delta y_{k,r}$, the modulo operation on N; $\Delta x_{k,r}$ is a moving step length from $x_{k,r-1}$ to $x_{k,r}$; $\Delta_{k,r}$ is a moving step length from $y_{k,r-1}$ to $y_{k,r}$; N is the number of resource units; and M is the maximum number of the user equipments that each resource unit can carry. For example, the following equation can be provided:

$$\Delta y_{k,r}=x_{k,r-1}+r-1+\Delta y_{init} \quad (5).$$

Where $\Delta y_{init}$ is a preset offset, and is an integer greater than or equal to zero.

Optionally, different functions may form different resource determination methods, and are separately described below.

Function 1

In this embodiment, the function G and the function F can be expressed as follows:

$$x_{k,r}=x_{k,r-1} \quad (6); \text{ and}$$

$$y_{k,r}=\mod(y_{k,r-1}+x_{k,r}+r-1+\Delta y_{init},N) \quad (7).$$

Where $\Delta y_{init}$ is a preset offset, and is an integer greater than or equal to zero.

$\Delta y_{init}=\lceil N/2 \rceil$, $\lceil\ \rceil$ indicates rounding up to an integer.

Function 2

$$x_{k,r}=\mod(x_{k,r-1}+y_{k,r-1}+\Delta x_{init},M) \quad (8); \text{ and}$$

$$y_{k,r}=\mod(y_{k,r-1}+x_{k,r}+r-1+\Delta y_{init},N) \quad (9).$$

Where $\Delta x_{init}$ and $\Delta y_{init}$ are preset offsets, and are integers greater than or equal to zero.

Function 3

$$x_{k,r}=\mod(x_{k,r-1}+y_{k,r-1}*\lfloor r/N \rfloor+\Delta x_{init},M) \quad (10); \text{ and}$$

$$y_{k,r}=\mod(y_{k,r-1}+x_{k,r}+r-1+\Delta y_{init},N) \quad (11).$$

Where $\lfloor\ \rfloor$ indicates rounding down to an integer; and $\Delta x_{init}$ and $\Delta y_{init}$ are preset offsets, and are integers greater than or equal to zero.

Function 4

$$x_{k,r}=\begin{cases} \mod(x_{k,r-1}+y_{k,r-1}+\Delta x_{init},M) & w=1 \\ x_{k,r-1} & w\neq 1 \end{cases}; \quad (12)$$

$$y_{k,r}=\begin{cases} \mod(y_{k,r-1}+x_{k,r}+\Delta y_{init},N) & w=1 \\ \mod(y_{k,r-1}+\mod(x_{k,r},w)+r+\Delta y_{init},N) & w\neq 1 \end{cases}; \quad (13)$$

and $$w=\mod(r,N). \quad (14)$$

Where $\Delta x_{init}$ and $\Delta y_{init}$ are preset offsets, and are integers greater than or equal to zero.

Function 5

$$x_{k,r}=\mod(x_{k,r-1}+y_{k,r-1}+\Delta x_{init},M) \quad (15); \text{ and}$$

$$y_{k,r}=\mod(y_{k,r-1}+\Delta y(x_{k,r})+\Delta y_{init},N) \quad (16).$$

Where $\Delta y$ is a sequence formed by random rearrangement of a sequence [0, 1, . . . , M−1]; and $\Delta y(x_{k,r})$ is the $(x_{k,r})$-th element in the sequence $\Delta y$, $\Delta x_{init}$ and $\Delta y_{init}$ are preset offsets, are integers greater than or equal to zero, and keep constant in the whole hopping process.

By adopting the above technology, the transmission resource determining method provided by the embodiments of the present disclosure can effectively schedule a plurality of user equipments, so that signal transmission of the user equipment on the frequency domain resources can be ergodically scheduled, and ergodicity of collision relationships between the plurality of user equipments is realized.

The transmission resource determining methods formed by the different functions are described in detail below with reference to specific embodiments.

Embodiment 1

Table 1.1 shows an initial resource sharing situation in which there are 4 RUs, each of which carries at most 4 UEs. $UE_0$, $UE_1$, $UE_2$, and $UE_3$ can be carried on $RU_0$, $UE_4$, $UE_5$, $UE_6$ and $UE_7$ can be carried on $RU_1$. $UE_8$, $UE_9$, $UE_{10}$ and $UE_{11}$ can be carried on $RU_2$. $UE_{12}$, $UE_{13}$, $UE_{14}$ and $UE_{15}$ can be carried on $RU_3$. As shown in Table 1.1, the values of identification information parameters X used by the UEs, namely, $UE_0$, $UE_4$, $UE_8$ and $UE_{12}$ which are on the different RUs but in the same column can be the same, e.g. X=0, which can be noted as X0. Based on this, one example is that the values of identification information parameters X used by the 4 UEs on the same RU can be 0, 1, 2 and 3, respectively. In another example, the value of identification information parameter X used by a UE can be the pilot sequence information used by the UE, e.g. pilot ID, pilot port ID, or pilot sequence ID, or can be the spreading sequence information used by the UE, e.g. spreading sequence ID. Actually, some of the UEs may not exist. If some UEs do not exist actually, hopping operations of other actually existing UEs are unaffected.

TABLE 1.1

Initial resource configuration before frequency hopping
(4 RUs, each of which carries at most 4 UEs)

|  | X0 | X1 | X2 | X3 |
| --- | --- | --- | --- | --- |
| RU0 | 0 | 1 | 2 | 3 |
| RU1 | 4 | 5 | 6 | 7 |

TABLE 1.1-continued

Initial resource configuration before frequency hopping
(4 RUs, each of which carries at most 4 UEs)

|     | X0 | X1 | X2 | X3 |
|-----|----|----|----|----|
| RU2 | 8  | 9  | 10 | 11 |
| RU3 | 12 | 13 | 14 | 15 |

Here, the number of RUs is N=4, and the maximum number of UEs carried by each RU is M=4. According to a criterion shown in Equations 1.1 and 1.2, resource sharing situations after the first frequency hopping to the eighth frequency hopping can be calculated based on the initial resource sharing situation shown in Table 1.1, as shown from Table 1.2 to Table 1.9. Based on this criterion, X parameters used by each of the UEs are unchanged.

$$x_{k,r} = x_{k,r-1} \quad (1.1); \text{ and}$$

$$y_{k,r} = \mod(y_{k,r-1} + x_{k,r} + r - 1 + \Delta y_{init}, N) \quad (1.2).$$

Here, $\Delta y_{init} = \lceil N/2 \rceil$, and $\lceil \ \rceil$ indicates rounding up to an integer; and r is the number of frequency hopping times.

TABLE 1.2

Resource sharing situation after the first frequency
hopping (4 RUs, each of which carries at most 4 UEs)

|     | X0 | X1 | X2 | X3 |
|-----|----|----|----|----|
| RU0 | 8  | 5  | 2  | 15 |
| RU1 | 12 | 9  | 6  | 3  |
| RU2 | 0  | 13 | 10 | 7  |
| RU3 | 4  | 1  | 14 | 11 |

TABLE 1.3

Resource sharing situation after the second frequency
hopping (4 RUs, each of which carries at most 4 UEs)

|     | X0 | X1 | X2 | X3 |
|-----|----|----|----|----|
| RU0 | 12 | 5  | 14 | 7  |
| RU1 | 0  | 9  | 2  | 11 |
| RU2 | 4  | 13 | 6  | 15 |
| RU3 | 8  | 1  | 10 | 3  |

TABLE 1.4

Resource sharing situation after the third frequency hopping
(4 RUs, each of which carries at most 4 UEs)

|     | X0 | X1 | X2 | X3 |
|-----|----|----|----|----|
| RU0 | 12 | 1  | 6  | 11 |
| RU1 | 0  | 5  | 10 | 15 |
| RU2 | 4  | 9  | 14 | 3  |
| RU3 | 8  | 13 | 2  | 7  |

TABLE 1.5

Resource sharing situation after the fourth frequency hopping
(4 RUs, each of which carries at most 4 UEs)

|     | X0 | X1 | X2 | X3 |
|-----|----|----|----|----|
| RU0 | 8  | 9  | 10 | 11 |
| RU1 | 12 | 13 | 14 | 15 |

TABLE 1.5-continued

Resource sharing situation after the fourth frequency hopping
(4 RUs, each of which carries at most 4 UEs)

|     | X0 | X1 | X2 | X3 |
|-----|----|----|----|----|
| RU2 | 0  | 1  | 2  | 3  |
| RU3 | 4  | 5  | 6  | 7  |

TABLE 1.6

Resource sharing situation after the fifth frequency hopping
(4 RUs, each of which carries at most 4 UEs)

|     | X0 | X1 | X2 | X3 |
|-----|----|----|----|----|
| RU0 | 0  | 13 | 10 | 7  |
| RU1 | 4  | 1  | 14 | 11 |
| RU2 | 8  | 5  | 2  | 15 |
| RU3 | 12 | 9  | 6  | 3  |

TABLE 1.7

Resource sharing situation after the sixth frequency hopping
(4 RUs, each of which carries at most 4 UEs)

|     | X0 | X1 | X2 | X3 |
|-----|----|----|----|----|
| RU0 | 4  | 13 | 6  | 15 |
| RU1 | 8  | 1  | 10 | 3  |
| RU2 | 12 | 5  | 14 | 7  |
| RU3 | 0  | 9  | 2  | 11 |

TABLE 1.8

Resource sharing situation after the seventh frequency
hopping (4 RUs, each of which carries at most 4 UEs)

|     | X0 | X1 | X2 | X3 |
|-----|----|----|----|----|
| RU0 | 4  | 9  | 14 | 3  |
| RU1 | 8  | 13 | 2  | 7  |
| RU2 | 12 | 1  | 6  | 11 |
| RU3 | 0  | 5  | 10 | 15 |

TABLE 1.9

Resource sharing situation after the eighth frequency hopping
(4 RUs, each of which carries at most 4 UEs)

|     | X0 | X1 | X2 | X3 |
|-----|----|----|----|----|
| RU0 | 0  | 1  | 2  | 3  |
| RU1 | 4  | 5  | 6  | 7  |
| RU2 | 8  | 9  | 10 | 11 |
| RU3 | 12 | 13 | 14 | 15 |

As shown in Table 1.9 and Table 1.1, the resource sharing situation after the eighth frequency hopping and the resource sharing situation before the frequency hoppings are exactly the same. This shows that a cycle of this frequency hopping method is 8.

Embodiment 2

Table 2.1 shows an initial scheduling distribution in which there are 4 RUs, each of which carries at most 2 UEs. $UE_0$ and $UE_1$ are carried on $RU_0$. $UE_2$ and $UE_3$ are carried on $RU_1$. $UE_4$ and $UE_5$ are carried on $RU_2$. $UE_6$ and $UE_7$ are carried on $RU_3$. As shown in Table 2.1, the values of identification information parameters X used by the UEs, namely, UE$_0$, UE$_2$, UE$_4$ and UE$_6$ which are on the different RUs but in the same column are the same. Actually, some of the UEs may not exist. If some UEs do not exist actually, hopping operations of other actually existing UEs are unaffected.

TABLE 2.1

Initial resource sharing situation before frequency hopping (4 RUs, each of which carries at most 2 UEs)

|  | X0 | X1 |
|---|---|---|
| RU0 | 0 | 1 |
| RU1 | 2 | 3 |
| RU2 | 4 | 5 |
| RU3 | 6 | 7 |

Here, the number of RUs is N=4, and the maximum number of UEs carried by each RU is M=2. According to a criterion shown in Equations 2.1 and 2.2, resource sharing situations after the first frequency hopping to the eighth frequency hopping can be calculated based on the initial resource sharing situation shown in Table 2.1, as shown from Table 2.2 to Table 2.9. Based on this criterion, X parameters used by each of the UEs are unchanged.

$$x_{k,r} = x_{k,r-1} \quad (2.1); \text{ and}$$

$$y_{k,r} = \mathrm{mod}(y_{k,r-1} + x_{k,r} + r - 1 + \Delta y_{init}, N) \quad (2.2).$$

Here, $\Delta y_{init} = \lceil N/2 \rceil$, and $\lceil \; \rceil$ indicates rounding up to an integer; and r is the number of frequency hopping times.

TABLE 2.2

Resource sharing situation after the first frequency hopping (4 RUs, each of which carries at most 2 UEs)

|  | X0 | X1 |
|---|---|---|
| RU0 | 4 | 3 |
| RU1 | 6 | 5 |
| RU2 | 0 | 7 |
| RU3 | 2 | 1 |

TABLE 2.3

Resource sharing situation after the second frequency hopping (4 RUs, each of which carries at most 2 UEs)

|  | X0 | X1 |
|---|---|---|
| RU0 | 6 | 3 |
| RU1 | 0 | 5 |
| RU2 | 2 | 7 |
| RU3 | 4 | 1 |

TABLE 2.4

Resource sharing situation after the third frequency hopping (4 RUs, each of which carries at most 2 UEs)

|  | X0 | X1 |
|---|---|---|
| RU0 | 6 | 1 |
| RU1 | 0 | 3 |
| RU2 | 2 | 5 |
| RU3 | 4 | 7 |

TABLE 2.5

Resource sharing situation after the fourth frequency hopping (4 RUs, each of which carries at most 2 UEs)

|  | X0 | X1 |
|---|---|---|
| RU0 | 4 | 5 |
| RU1 | 6 | 7 |
| RU2 | 0 | 1 |
| RU3 | 2 | 3 |

TABLE 2.6

Resource sharing situation after the fifth frequency hopping (4 RUs, each of which carries at most 2 UEs)

|  | X0 | X1 |
|---|---|---|
| RU0 | 0 | 7 |
| RU1 | 2 | 1 |
| RU2 | 4 | 3 |
| RU3 | 6 | 5 |

TABLE 2.7

Resource sharing situation after the sixth frequency hopping (4 RUs, each of which carries at most 2 UEs)

|  | X0 | X1 |
|---|---|---|
| RU0 | 2 | 7 |
| RU1 | 4 | 1 |
| RU2 | 6 | 3 |
| RU3 | 0 | 5 |

TABLE 2.8

Resource sharing situation after the seventh frequency hopping (4 RUs, each of which carries at most 2 UEs)

|  | X0 | X1 |
|---|---|---|
| RU0 | 2 | 5 |
| RU1 | 4 | 7 |
| RU2 | 6 | 1 |
| RU3 | 0 | 3 |

TABLE 2.9

Resource sharing situation after the eighth frequency hopping (4 RUs, each of which carries at most 2 UEs)

|  | X0 | X1 |
|---|---|---|
| RU0 | 0 | 1 |
| RU1 | 2 | 3 |
| RU2 | 4 | 5 |
| RU3 | 6 | 7 |

Embodiment 3

Table 3.1 shows an initial scheduling distribution in which there are 4 RUs, each of which carries at most 5 UEs. UE$_0$, UE$_1$, UE$_2$, UE$_3$ and UE$_4$ are carried on RU$_0$. UE$_5$, UE$_6$, UE$_7$, UE$_8$ and UE$_9$ are carried on RU$_1$. UE$_{10}$, UE$_{11}$, UE$_{12}$, UE$_{13}$ and UE$_{14}$ are carried on RU$_2$. UE$_{15}$, UE$_{16}$, UE$_{17}$, UE$_{18}$ and UE$_{19}$ are carried on RU$_3$. As shown in Table 3.1, the values of identification information parameters X used by the UEs, namely, UE$_0$, UE$_5$, UE$_{10}$ and UE$_{15}$ which are on the different RUs but in the same column are the same. Actually, some of the UEs may not exist. If some UEs do not exist actually, hopping operations of other actually existing UEs are unaffected.

TABLE 3.1

Initial resource sharing situation before frequency hopping (4 RUs, each of which carries at most 5 UEs)

|  | X0 | X1 | X2 | X3 | X4 |
|---|---|---|---|---|---|
| RU0 | 0 | 1 | 2 | 3 | 4 |
| RU1 | 5 | 6 | 7 | 8 | 9 |
| RU2 | 10 | 11 | 12 | 13 | 14 |
| RU3 | 15 | 16 | 17 | 18 | 19 |

Here, the number of RUs is N=4, and the maximum number of UEs carried by each RU is M=5. According to criterion shown in Equations 3.1 and 3.2, resource sharing situations after the first frequency hopping to the eighth frequency hopping can be calculated based on the initial resource sharing situation shown in Table 3.1, as shown from Table 3.2 to Table 3.9. Based on this criterion, X parameters used by each of the UEs are unchanged.

$$x_{k,r} = x_{k,r-1} \quad (3.1); \text{ and}$$

$$y_{k,r} = \mathrm{mod}(y_{k,r-1} + x_{k,r} + r - 1 + \Delta y_{init}, N) \quad (3.2).$$

Here, $\Delta y_{init} = \lceil N/2 \rceil$, and $\lceil \ \rceil$ indicates rounding up to an integer; and r is the number of frequency hopping times.

TABLE 3.2

Resource sharing situation after the first frequency hopping (4 RUs, each of which carries at most 5 UEs)

|  | X0 | X1 | X2 | X3 | X4 |
|---|---|---|---|---|---|
| RU0 | 10 | 6 | 2 | 18 | 14 |
| RU1 | 15 | 11 | 7 | 3 | 19 |
| RU2 | 0 | 16 | 12 | 8 | 4 |
| RU3 | 5 | 1 | 17 | 13 | 9 |

TABLE 3.3

Resource sharing situation after the second frequency hopping (4 RUs, each of which carries at most 5 UEs)

|  | X0 | X1 | X2 | X3 | X4 |
|---|---|---|---|---|---|
| RU0 | 15 | 6 | 17 | 8 | 19 |
| RU1 | 0 | 11 | 2 | 13 | 4 |
| RU2 | 5 | 16 | 7 | 18 | 9 |
| RU3 | 10 | 1 | 12 | 3 | 14 |

TABLE 3.4

Resource sharing situation after the third frequency hopping (4 RUs, each of which carries at most 5 UEs)

|  | X0 | X1 | X2 | X3 | X4 |
|---|---|---|---|---|---|
| RU0 | 15 | 1 | 7 | 13 | 19 |
| RU1 | 0 | 6 | 12 | 18 | 4 |
| RU2 | 5 | 11 | 17 | 3 | 9 |
| RU3 | 10 | 16 | 2 | 8 | 14 |

TABLE 3.5

Resource sharing situation after the fourth frequency hopping (4 RUs, each of which carries at most 5 UEs)

|  | X0 | X1 | X2 | X3 | X4 |
|---|---|---|---|---|---|
| RU0 | 10 | 11 | 12 | 13 | 14 |
| RU1 | 15 | 16 | 17 | 18 | 19 |
| RU2 | 0 | 1 | 2 | 3 | 4 |
| RU3 | 5 | 6 | 7 | 8 | 9 |

TABLE 3.6

Resource sharing situation after the fifth frequency hopping (4 RUs, each of which carries at most 5 UEs)

|  | X0 | X1 | X2 | X3 | X4 |
|---|---|---|---|---|---|
| RU0 | 0 | 16 | 12 | 8 | 4 |
| RU1 | 5 | 1 | 17 | 13 | 9 |
| RU2 | 10 | 6 | 2 | 18 | 14 |
| RU3 | 15 | 11 | 7 | 3 | 19 |

TABLE 3.7

Resource sharing situation after the sixth frequency hopping (4 RUs, each of which carries at most 5 UEs)

|  | X0 | X1 | X2 | X3 | X4 |
|---|---|---|---|---|---|
| RU0 | 5 | 16 | 7 | 18 | 9 |
| RU1 | 10 | 1 | 12 | 3 | 14 |
| RU2 | 15 | 6 | 17 | 8 | 19 |
| RU3 | 0 | 11 | 2 | 13 | 4 |

TABLE 3.8

Resource sharing situation after the seventh frequency hopping (4 RUs, each of which carries at most 5 UEs)

|  | X0 | X1 | X2 | X3 | X4 |
|---|---|---|---|---|---|
| RU0 | 5 | 11 | 17 | 3 | 9 |
| RU1 | 10 | 16 | 2 | 8 | 14 |
| RU2 | 15 | 1 | 7 | 13 | 19 |
| RU3 | 0 | 6 | 12 | 18 | 4 |

TABLE 3.9

Resource sharing situation after the eighth frequency hopping (4 RUs, each of which carries at most 5 UEs)

|  | X0 | X1 | X2 | X3 | X4 |
|---|---|---|---|---|---|
| RU0 | 0 | 1 | 2 | 3 | 4 |
| RU1 | 5 | 6 | 7 | 8 | 9 |
| RU2 | 10 | 11 | 12 | 13 | 14 |
| RU3 | 15 | 16 | 17 | 18 | 19 |

It can be seen that the resource sharing situation after the eighth frequency hopping shown in Table 3.9 and the resource sharing situation before the frequency hoppings shown in Table 3.1 are exactly the same. This shows that a scheduling change cycle of the frequency hopping is still 8.

Embodiment 4

Table 4.1 shows an initial scheduling distribution in which there are 4 RUs, each of which carries at most 4 UEs. $UE_0$, $UE_1$, $UE_2$, and $UE_3$ are carried on $RU_0$. $UE_4$, $UE_5$, $UE_6$ and $UE_7$ are carried on $RU_1$. $UE_8$, $UE_9$, $UE_{10}$ and $UE_{11}$ are carried on $RU_2$. $UE_{12}$, $UE_{13}$, $UE_{14}$ and $UE_{15}$ are carried on $RU_3$. As shown in Table 4.1, the values of identification information parameters X used by the UEs, namely, $UE_0$, $UE_4$, $UE_8$ and $UE_{12}$ which are on the different RUs but in the same column are the same. Actually, some of the UEs may not exist. If some UEs do not exist actually, hopping operations of other actually existing UEs are unaffected.

TABLE 4.1

Initial resource sharing situation before frequency hopping (4 RUs, each of which carries at most 4 UEs)

|     | X0 | X1 | X2 | X3 |
| --- | --- | --- | --- | --- |
| RU0 | 0  | 1  | 2  | 3  |
| RU1 | 4  | 5  | 6  | 7  |
| RU2 | 8  | 9  | 10 | 11 |
| RU3 | 12 | 13 | 14 | 15 |

Here, the number of RUs is N=4, and the maximum number of UEs carried by each RU is M=4. According to criterion shown in Equations 4.1 and 4.2, based on the initial resource sharing situation shown in Table 4.1, a resource sharing situation after the first frequency hopping is calculated, then a resource sharing situation after the second frequency hopping is calculated based on the resource sharing situation after the first frequency hopping, and so on, as shown from Table 4.2 to Table 4.13. Based on this criterion, X parameters used by each of the UEs are changeable.

$$x_{k,r} = \mod(x_{k,r-1} + y_{k,r-1} + \Delta x_{init}, M) \quad (4.1); \text{ and}$$

$$y_{k,r} = \mod(y_{k,r-1} + x_{k,r} + r - 1 + \Delta y_{init}, N) \quad (4.2).$$

Here, $\Delta x_{init} = 0$, and $\Delta y_{init} = \lceil N/2 \rceil$; and r is the number of frequency hopping times.

TABLE 4.2

Resource sharing situation after the first frequency hopping (4 RUs, each of which carries at most 4 UEs)

|     | X0 | X1 | X2 | X3 |
| --- | --- | --- | --- | --- |
| RU0 | 10 | 4  | 2  | 12 |
| RU1 | 13 | 11 | 5  | 3  |
| RU2 | 0  | 14 | 8  | 6  |
| RU3 | 7  | 1  | 15 | 9  |

TABLE 4.3

Resource sharing situation after the second frequency hopping (4 RUs, each of which carries at most 4 UEs)

|     | X0 | X1 | X2 | X3 |
| --- | --- | --- | --- | --- |
| RU0 | 3  | 4  | 9  | 14 |
| RU1 | 8  | 13 | 2  | 7  |
| RU2 | 1  | 6  | 11 | 12 |
| RU3 | 10 | 15 | 0  | 5  |

TABLE 4.4

Resource sharing situation after the third frequency hopping (4 RUs, each of which carries at most 4 UEs)

|     | X0 | X1 | X2 | X3 |
| --- | --- | --- | --- | --- |
| RU0 | 3  | 0  | 1  | 2  |
| RU1 | 7  | 4  | 5  | 6  |

TABLE 4.4-continued

Resource sharing situation after the third frequency hopping (4 RUs, each of which carries at most 4 UEs)

|     | X0 | X1 | X2 | X3 |
| --- | --- | --- | --- | --- |
| RU2 | 11 | 8  | 9  | 10 |
| RU3 | 15 | 12 | 13 | 14 |

TABLE 4.5

Resource sharing situation after the fourth frequency hopping (4 RUs, each of which carries at most 4 UEs)

|     | X0 | X1 | X2 | X3 |
| --- | --- | --- | --- | --- |
| RU0 | 12 | 10 | 4  | 2  |
| RU1 | 3  | 13 | 11 | 5  |
| RU2 | 6  | 0  | 14 | 8  |
| RU3 | 9  | 7  | 1  | 15 |

TABLE 4.6

Resource sharing situation after the fifth frequency hopping (4 RUs, each of which carries at most 4 UEs)

|     | X0 | X1 | X2 | X3 |
| --- | --- | --- | --- | --- |
| RU0 | 14 | 3  | 4  | 9  |
| RU1 | 7  | 8  | 13 | 2  |
| RU2 | 12 | 1  | 6  | 11 |
| RU3 | 5  | 10 | 15 | 0  |

TABLE 4.7

Resource sharing situation after the sixth frequency hopping (4 RUs, each of which carries at most 4 UEs)

|     | X0 | X1 | X2 | X3 |
| --- | --- | --- | --- | --- |
| RU0 | 2  | 3  | 0  | 1  |
| RU1 | 6  | 7  | 4  | 5  |
| RU2 | 10 | 11 | 8  | 9  |
| RU3 | 14 | 15 | 12 | 13 |

TABLE 4.8

Resource sharing situation after the seventh frequency hopping (4 RUs, each of which carries at most 4 UEs)

|     | X0 | X1 | X2 | X3 |
| --- | --- | --- | --- | --- |
| RU0 | 2  | 12 | 10 | 4  |
| RU1 | 5  | 3  | 13 | 11 |
| RU2 | 8  | 6  | 0  | 14 |
| RU3 | 15 | 9  | 7  | 1  |

TABLE 4.9

Resource sharing situation after the eighth frequency hopping (4 RUs, each of which carries at most 4 UEs)

|     | X0 | X1 | X2 | X3 |
| --- | --- | --- | --- | --- |
| RU0 | 9  | 14 | 3  | 4  |
| RU1 | 2  | 7  | 8  | 13 |
| RU2 | 11 | 12 | 1  | 6  |
| RU3 | 0  | 5  | 10 | 15 |

TABLE 4.10

Resource sharing situation after the ninth frequency hopping (4 RUs, each of which carries at most 4 UEs)

|     | X0 | X1 | X2 | X3 |
|-----|----|----|----|----|
| RU0 | 1  | 2  | 3  | 0  |
| RU1 | 5  | 6  | 7  | 4  |
| RU2 | 9  | 10 | 11 | 8  |
| RU3 | 13 | 14 | 15 | 12 |

TABLE 4.11

Resource sharing situation after the tenth frequency hopping (4 RUs, each of which carries at most 4 UEs)

|     | X0 | X1 | X2 | X3 |
|-----|----|----|----|----|
| RU0 | 4  | 2  | 12 | 10 |
| RU1 | 11 | 5  | 3  | 13 |
| RU2 | 14 | 8  | 6  | 0  |
| RU3 | 1  | 15 | 9  | 7  |

TABLE 4.12

Resource sharing situation after the eleventh frequency hopping (4 RUs, each of which carries at most 4 UEs)

|     | X0 | X1 | X2 | X3 |
|-----|----|----|----|----|
| RU0 | 4  | 9  | 14 | 3  |
| RU1 | 13 | 2  | 7  | 8  |
| RU2 | 6  | 11 | 12 | 1  |
| RU3 | 15 | 0  | 5  | 10 |

TABLE 4.13

Resource sharing situation after the twelfth frequency hopping (4 RUs, each of which carries at most 4 UEs)

|     | X0 | X1 | X2 | X3 |
|-----|----|----|----|----|
| RU0 | 0  | 1  | 2  | 3  |
| RU1 | 4  | 5  | 6  | 7  |
| RU2 | 8  | 9  | 10 | 11 |
| RU3 | 12 | 13 | 14 | 15 |

It can be seen from Table 4.1 and Table 4.13 that the resource sharing situation after the twelfth frequency hopping and the resource sharing situation before the frequency hoppings are exactly the same, so that a change cycle of the UE resource sharing situation based on the current frequency hopping criterion is 12.

Embodiment 5

Table 5.1 shows an initial scheduling distribution in which there are 4 RUs, each of which carries at most 4 UEs. $UE_0$, $UE_1$, $UE_2$, and $UE_3$ are carried on $RU_0$. $UE_4$, $UE_5$, $UE_6$ and $UE_7$ are carried on $RU_1$. $UE_8$, $UE_9$, $UE_{10}$ and $UE_{11}$ are carried on $RU_2$. $UE_{12}$, $UE_{13}$, $UE_{14}$ and $UE_{15}$ are carried on $RU_3$. As shown in Table 5.1, the values of identification information parameters X used by the UEs, namely, $UE_0$, $UE_4$, $UE_8$ and $UE_{12}$ which are on the different RUs but in the same column are the same. Actually, some of the UEs may not exist. If some UEs do not exist actually, hopping operations of other actually existing UEs are unaffected.

TABLE 5.1

Initial resource sharing situation before frequency hopping (4 RUs, each of which carries at most 4 UEs)

|     | X0 | X1 | X2 | X3 |
|-----|----|----|----|----|
| RU0 | 0  | 1  | 2  | 3  |
| RU1 | 4  | 5  | 6  | 7  |
| RU2 | 8  | 9  | 10 | 11 |
| RU3 | 12 | 13 | 14 | 15 |

Here, the number of RUs is N=4, and the maximum number of UEs carried by each RU is M=4. According to a criterion shown in Equations 5.1 and 5.2, based on the initial resource sharing situation shown in Table 5.1, a resource sharing situation after the first frequency hopping is calculated, then a resource sharing situation after the second frequency hopping is calculated based on the resource sharing situation after the first frequency hopping, and so on a resource sharing situation after the twelfth frequency hopping is calculated, as shown from Table 5.2 to Table 5.13. Based on this criterion, X parameters used by each of the UEs are changeable.

$$x_{k,r} = \mathrm{mod}(x_{k,r-1} + y_{k,r-1} * \lfloor r/N \rfloor + \Delta x_{init}, M) \quad (5.1); \text{ and}$$

$$y_{k,r} = \mathrm{mod}(y_{k,r-1} + x_{k,r} + r - 1 + \Delta y_{init}, N) \quad (5.2).$$

Here, $\Delta x_{init} = 0$, and $\Delta y_{init} = \lceil N/2 \rceil$.

TABLE 5.2

Resource sharing situation after the first frequency hopping (4 RUs, each of which carries at most 4 UEs)

|     | X0 | X1 | X2 | X3 |
|-----|----|----|----|----|
| RU0 | 8  | 5  | 2  | 15 |
| RU1 | 12 | 9  | 6  | 3  |
| RU2 | 0  | 13 | 10 | 7  |
| RU3 | 4  | 1  | 14 | 11 |

TABLE 5.3

Resource sharing situation after the second frequency hopping (4 RUs, each of which carries at most 4 UEs)

|     | X0 | X1 | X2 | X3 |
|-----|----|----|----|----|
| RU0 | 12 | 5  | 14 | 7  |
| RU1 | 0  | 9  | 2  | 11 |
| RU2 | 4  | 13 | 6  | 15 |
| RU3 | 8  | 1  | 10 | 3  |

TABLE 5.4

Resource sharing situation after the third frequency hopping (4 RUs, each of which carries at most 4 UEs)

|     | X0 | X1 | X2 | X3 |
|-----|----|----|----|----|
| RU0 | 12 | 1  | 6  | 11 |
| RU1 | 0  | 5  | 10 | 15 |
| RU2 | 4  | 9  | 14 | 3  |
| RU3 | 8  | 13 | 2  | 7  |

TABLE 5.5

Resource sharing situation after the fourth frequency hopping (4 RUs, each of which carries at most 4 UEs)

|     | X0 | X1 | X2 | X3 |
|-----|----|----|----|----|
| RU0 | 13 | 3  | 5  | 11 |
| RU1 | 12 | 2  | 4  | 10 |
| RU2 | 15 | 1  | 7  | 9  |
| RU3 | 14 | 0  | 6  | 8  |

TABLE 5.6

Resource sharing situation after the fifth frequency hopping (4 RUs, each of which carries at most 4 UEs)

|     | X0 | X1 | X2 | X3 |
|-----|----|----|----|----|
| RU0 | 7  | 12 | 5  | 14 |
| RU1 | 0  | 9  | 2  | 11 |
| RU2 | 13 | 6  | 15 | 4  |
| RU3 | 10 | 3  | 8  | 1  |

TABLE 5.7

Resource sharing situation after the sixth frequency hopping (4 RUs, each of which carries at most 4 UEs)

|     | X0 | X1 | X2 | X3 |
|-----|----|----|----|----|
| RU0 | 11 | 12 | 1  | 6  |
| RU1 | 15 | 0  | 5  | 10 |
| RU2 | 3  | 4  | 9  | 14 |
| RU3 | 7  | 8  | 13 | 2  |

TABLE 5.8

Resource sharing situation after the seventh frequency hopping (4 RUs, each of which carries at most 4 UEs)

|     | X0 | X1 | X2 | X3 |
|-----|----|----|----|----|
| RU0 | 11 | 13 | 3  | 5  |
| RU1 | 10 | 12 | 2  | 4  |
| RU2 | 9  | 15 | 1  | 7  |
| RU3 | 8  | 14 | 0  | 6  |

TABLE 5.9

Resource sharing situation after the eighth frequency hopping (4 RUs, each of which carries at most 4 UEs)

|     | X0 | X1 | X2 | X3 |
|-----|----|----|----|----|
| RU0 | 0  | 15 | 10 | 5  |
| RU1 | 11 | 6  | 1  | 12 |
| RU2 | 2  | 13 | 8  | 7  |
| RU3 | 9  | 4  | 3  | 14 |

TABLE 5.10

Resource sharing situation after the ninth frequency hopping (4 RUs, each of which carries at most 4 UEs)

|     | X0 | X1 | X2 | X3 |
|-----|----|----|----|----|
| RU0 | 2  | 12 | 10 | 4  |
| RU1 | 3  | 13 | 11 | 5  |
| RU2 | 0  | 14 | 8  | 6  |
| RU3 | 1  | 15 | 9  | 7  |

TABLE 5.11

Resource sharing situation after the tenth frequency hopping (4 RUs, each of which carries at most 4 UEs)

|     | X0 | X1 | X2 | X3 |
|-----|----|----|----|----|
| RU0 | 11 | 12 | 1  | 6  |
| RU1 | 0  | 5  | 10 | 15 |
| RU2 | 9  | 14 | 3  | 4  |
| RU3 | 2  | 7  | 8  | 13 |

TABLE 5.12

Resource sharing situation after the eleventh frequency hopping (4 RUs, each of which carries at most 4 UEs)

|     | X0 | X1 | X2 | X3 |
|-----|----|----|----|----|
| RU0 | 11 | 13 | 3  | 5  |
| RU1 | 10 | 12 | 2  | 4  |
| RU2 | 9  | 15 | 1  | 7  |
| RU3 | 8  | 14 | 0  | 6  |

It can be seen from Table 5.12 and Table 5.8 that the resource sharing situation after the eleventh frequency hopping and the resource sharing situation after the seventh frequency hopping are exactly the same.

TABLE 5.13

Resource sharing situation after the twelfth frequency hopping (4 RUs, each of which carries at most 4 UEs)

|     | X0 | X1 | X2 | X3 |
|-----|----|----|----|----|
| RU0 | 6  | 7  | 4  | 5  |
| RU1 | 11 | 8  | 9  | 10 |
| RU2 | 12 | 13 | 14 | 15 |
| RU3 | 1  | 2  | 3  | 0  |

It can be seen from Table 5.13 and Table 5.1 that after the twelfth frequency hopping, a collision combination relationship the same as the initial resource sharing situation appears, but the locations of the UEs on the RUs are still different from those in the initial resource sharing situation.

Through further deduction, it can be found that based on this frequency hopping criterion, the initial resource sharing situation will not appear again completely until the forty-eighth frequency hopping.

Embodiment 6

Table 6.1 shows an initial scheduling distribution in which there are 4 RUs, each of which carries at most 4 UEs. $UE_0$, $UE_1$, $UE_2$, and $UE_3$ are carried on $RU_0$. $UE_4$, $UE_5$, $UE_6$ and $UE_7$ are carried on $RU_1$. $UE_8$, $UE_9$, $UE_{10}$ and $UE_{11}$ are carried on $RU_2$. $UE_{12}$, $UE_{13}$, $UE_{14}$ and $UE_{15}$ are carried on $RU_3$. As shown in Table 6.1, the values of identification information parameters X used by the UEs, namely, $UE_0$, $UE_4$, $UE_8$ and $UE_{12}$ which are on the different RUs but in the same column are the same. Actually, some of the UEs may not exist. If some UEs do not exist actually, hopping operations of other actually existing UEs are unaffected.

TABLE 6.1

Initial resource sharing situation before frequency hopping (4 RUs, each of which carries at most 4 UEs)

|  | X0 | X1 | X2 | X3 |
|---|---|---|---|---|
| RU0 | 0 | 1 | 2 | 3 |
| RU1 | 4 | 5 | 6 | 7 |
| RU2 | 8 | 9 | 10 | 11 |
| RU3 | 12 | 13 | 14 | 15 |

Here, the number of RUs is N=4, and the maximum number of UEs carried by each RU is M=4. According to a criterion shown in Equations 6.1, 6.2 and 6.3, based on the initial resource sharing situation shown in Table 6.1, a resource sharing situation after the first frequency hopping is calculated, then a resource sharing situation after the second frequency hopping is calculated based on the resource sharing situation after the first frequency hopping, . . . , and similarly, a resource sharing situation after the twelfth frequency hopping is calculated, as shown from Table 6.2 to Table 6.13. Based on this criterion, X parameters used by each of the UEs are changeable.

$$x_{k,r} = \begin{cases} \mod(x_{k,r-1} + y_{k,r-1} + \Delta x_{init}, M) & w = 1 \\ x_{k,r-1} & w \neq 1 \end{cases} ; \quad (6.1)$$

$$y_{k,r} = \begin{cases} \mod(y_{k,r-1} + x_{k,r} + r + \Delta y_{init}, N) & w = 1 \\ \mod(y_{k,r-1} + \mod(x_{k,r}, w) + r + \Delta y_{init}, N) & w \neq 1 \end{cases} ; \quad (6.2)$$

and $$w = \mod(r, N). \quad (6.3)$$

Here, $\Delta x_{init} = 0$, and $\Delta y_{init} = 0$.

TABLE 6.2

Resource sharing situation after the first frequency hopping (4 RUs, each of which carries at most 4 UEs)

|  | X0 | X1 | X2 | X3 |
|---|---|---|---|---|
| RU0 | 13 | 11 | 5 | 3 |
| RU1 | 0 | 14 | 8 | 6 |
| RU2 | 7 | 1 | 15 | 9 |
| RU3 | 10 | 4 | 2 | 12 |

TABLE 6.3

Resource sharing situation after the second frequency hopping (4 RUs, each of which carries at most 4 UEs)

|  | X0 | X1 | X2 | X3 |
|---|---|---|---|---|
| RU0 | 7 | 14 | 15 | 6 |
| RU1 | 10 | 1 | 2 | 9 |
| RU2 | 13 | 4 | 5 | 12 |
| RU3 | 0 | 11 | 8 | 3 |

TABLE 6.4

Resource sharing situation after the third frequency hopping (4 RUs, each of which carries at most 4 UEs)

|  | X0 | X1 | X2 | X3 |
|---|---|---|---|---|
| RU0 | 10 | 14 | 8 | 9 |
| RU1 | 13 | 1 | 15 | 12 |
| RU2 | 0 | 4 | 2 | 3 |
| RU3 | 7 | 11 | 5 | 6 |

TABLE 6.5

Resource sharing situation after the fourth frequency hopping (4 RUs, each of which carries at most 4 UEs)

|  | X0 | X1 | X2 | X3 |
|---|---|---|---|---|
| RU0 | 10 | 11 | 2 | 12 |
| RU1 | 13 | 14 | 5 | 3 |
| RU2 | 0 | 1 | 8 | 6 |
| RU3 | 7 | 4 | 15 | 9 |

TABLE 6.6

Resource sharing situation after the fifth frequency hopping (4 RUs, each of which carries at most 4 UEs)

|  | X0 | X1 | X2 | X3 |
|---|---|---|---|---|
| RU0 | 4 | 6 | 14 | 12 |
| RU1 | 10 | 15 | 0 | 5 |
| RU2 | 3 | 11 | 9 | 1 |
| RU3 | 8 | 13 | 2 | 7 |

TABLE 6.7

Resource sharing situation after the sixth frequency hopping (4 RUs, each of which carries at most 4 UEs)

|  | X0 | X1 | X2 | X3 |
|---|---|---|---|---|
| RU0 | 3 | 15 | 9 | 5 |
| RU1 | 8 | 11 | 2 | 1 |
| RU2 | 4 | 13 | 14 | 7 |
| RU3 | 10 | 6 | 0 | 12 |

TABLE 6.8

Resource sharing situation after the seventh frequency hopping (4 RUs, each of which carries at most 4 UEs)

|  | X0 | X1 | X2 | X3 |
|---|---|---|---|---|
| RU0 | 8 | 15 | 0 | 1 |
| RU1 | 4 | 11 | 9 | 7 |
| RU2 | 10 | 13 | 2 | 12 |
| RU3 | 3 | 6 | 14 | 5 |

TABLE 6.9

Resource sharing situation after the eighth frequency hopping (4 RUs, each of which carries at most 4 UEs)

|  | X0 | X1 | X2 | X3 |
|---|---|---|---|---|
| RU0 | 8 | 6 | 2 | 7 |
| RU1 | 4 | 15 | 14 | 12 |

TABLE 6.9-continued

Resource sharing situation after the eighth frequency hopping
(4 RUs, each of which carries at most 4 UEs)

|     | X0 | X1 | X2 | X3 |
|-----|----|----|----|----|
| RU2 | 10 | 11 | 0  | 5  |
| RU3 | 3  | 13 | 9  | 1  |

TABLE 6.10

Resource sharing situation after the ninth frequency hopping
(4 RUs, each of which carries at most 4 UEs)

|     | X0 | X1 | X2 | X3 |
|-----|----|----|----|----|
| RU0 | 13 | 5  | 15 | 7  |
| RU1 | 8  | 9  | 10 | 14 |
| RU2 | 12 | 6  | 1  | 11 |
| RU3 | 0  | 4  | 2  | 3  |

TABLE 6.11

Resource sharing situation after the tenth frequency hopping
(4 RUs, each of which carries at most 4 UEs)

|     | X0 | X1 | X2 | X3 |
|-----|----|----|----|----|
| RU0 | 12 | 9  | 1  | 14 |
| RU1 | 0  | 6  | 2  | 11 |
| RU2 | 13 | 4  | 15 | 3  |
| RU3 | 8  | 5  | 10 | 7  |

TABLE 6.12

Resource sharing situation after the eleventh frequency hopping
(4 RUs, each of which carries at most 4 UEs)

|     | X0 | X1 | X2 | X3 |
|-----|----|----|----|----|
| RU0 | 0  | 9  | 10 | 11 |
| RU1 | 13 | 6  | 1  | 3  |
| RU2 | 8  | 4  | 2  | 7  |
| RU3 | 12 | 5  | 15 | 14 |

TABLE 6.13

Resource sharing situation after the twelfth frequency hopping
(4 RUs, each of which carries at most 4 UEs)

|     | X0 | X1 | X2 | X3 |
|-----|----|----|----|----|
| RU0 | 0  | 5  | 2  | 3  |
| RU1 | 13 | 9  | 15 | 7  |
| RU2 | 8  | 6  | 10 | 14 |
| RU3 | 12 | 4  | 1  | 11 |

It can be seen from Table 6.1 to Table 6.13 that there is no recurrence of any one of collision relationships. If the deduction is continued according to this frequency hopping criterion, the initial resource sharing situation will appear again completely after the 168$^{th}$ frequency hopping.

Embodiment 7

Table 7.1 shows an initial scheduling distribution in which there are 4 RUs, each of which carries at most 4 UEs. $UE_0$, $UE_1$, $UE_2$, and $UE_3$ are carried on $RU_0$. $UE_4$, $UE_5$, $UE_6$ and $UE_7$ are carried on $RU_1$. $UE_8$, $UE_9$, $UE_{10}$ and $UE_{11}$ are carried on $RU_2$. $UE_{12}$, $UE_{13}$, $UE_{14}$ and $UE_{15}$ are carried on $RU_3$. As shown in Table 7.1, the values of identification information parameters X used by the UEs, namely, $UE_0$, $UE_4$, $UE_8$ and $UE_{12}$ which are on the different RUs but in the same column are the same. Actually, some of the UEs may not exist. If some UEs do not exist actually, hopping operations of other actually existing UEs are unaffected.

TABLE 7.1

Initial resource sharing situation before frequency hopping
(4 RUs, each of which carries at most 4 UEs)

|     | X0 | X1 | X2 | X3 |
|-----|----|----|----|----|
| RU0 | 0  | 1  | 2  | 3  |
| RU1 | 4  | 5  | 6  | 7  |
| RU2 | 8  | 9  | 10 | 11 |
| RU3 | 12 | 13 | 14 | 15 |

Here, the number of RUs is N=4, and the maximum number of UEs carried by each RU is M=4. According to a criterion shown in Equations 7.1 and 7.2, a resource sharing situation after the first frequency hopping is calculated based on the initial resource sharing situation shown in Table 7.1, then a resource sharing situation after the second frequency hopping is calculated based on the resource sharing situation after the first frequency hopping, and so on a resource sharing situation after the twelfth frequency hopping is calculated, as shown from Table 7.2 to Table 7.13. Based on this criterion, X parameters used by each of the UEs are changeable.

$$x_{k,r} = \mathrm{mod}(x_{k,r-1} + y_{k,r-1} + \Delta x_{init}, M) \quad (7.1); \text{ and}$$

$$y_{k,r} = \mathrm{mod}(y_{k,r-1} + \Delta y(x_{k,r}) + \Delta y_{init}, N) \quad (7.2).$$

Here, $\Delta y$ is a sequence formed by random rearrangement of a sequence $[0, 1, \ldots, M-1]$; and $\Delta y(x_{k,r})$ is the $(x_{k,r})$-th element in the sequence $\Delta y$. $\Delta x_{init}=0$, and $\Delta y_{init}=0$.

TABLE 7.2

Resource sharing situation after the first frequency hopping
(4 RUs, each of which carries at most 4 UEs)

|     | X0 | X1 | X2 | X3 |
|-----|----|----|----|----|
| RU0 | 0  | 4  | 15 | 9  |
| RU1 | 7  | 11 | 2  | 12 |
| RU2 | 10 | 14 | 5  | 3  |
| RU3 | 13 | 1  | 8  | 6  |

TABLE 7.3

Resource sharing situation after the second frequency hopping
(4 RUs, each of which carries at most 4 UEs)

|     | X0 | X1 | X2 | X3 |
|-----|----|----|----|----|
| RU0 | 1  | 4  | 10 | 2  |
| RU1 | 0  | 7  | 6  | 14 |
| RU2 | 12 | 3  | 15 | 13 |
| RU3 | 5  | 8  | 11 | 9  |

TABLE 7.4

Resource sharing situation after the third frequency hopping (4 RUs, each of which carries at most 4 UEs)

|     | X0 | X1 | X2 | X3 |
|-----|----|----|----|----|
| RU0 | 15 | 4  | 7  | 5  |
| RU1 | 8  | 0  | 12 | 2  |

TABLE 7.4-continued

Resource sharing situation after the third frequency hopping (4 RUs, each of which carries at most 4 UEs)

|     | X0 | X1 | X2 | X3 |
|-----|----|----|----|----|
| RU2 | 1  | 13 | 9  | 6  |
| RU3 | 14 | 11 | 10 | 3  |

TABLE 7.5

Resource sharing situation after the fourth frequency hopping (4 RUs, each of which carries at most 4 UEs)

|     | X0 | X1 | X2 | X3 |
|-----|----|----|----|----|
| RU0 | 11 | 6  | 7  | 12 |
| RU1 | 15 | 10 | 0  | 13 |
| RU2 | 2  | 4  | 1  | 14 |
| RU3 | 9  | 8  | 3  | 5  |

TABLE 7.6

Resource sharing situation after the fifth frequency hopping (4 RUs, each of which carries at most 4 UEs)

|     | X0 | X1 | X2 | X3 |
|-----|----|----|----|----|
| RU0 | 13 | 6  | 2  | 9  |
| RU1 | 1  | 15 | 5  | 12 |
| RU2 | 8  | 14 | 7  | 0  |
| RU3 | 11 | 3  | 10 | 4  |

TABLE 7.7

Resource sharing situation after the sixth frequency hopping (4 RUs, each of which carries at most 4 UEs)

|     | X0 | X1 | X2 | X3 |
|-----|----|----|----|----|
| RU0 | 7  | 6  | 15 | 11 |
| RU1 | 3  | 1  | 8  | 9  |
| RU2 | 13 | 0  | 4  | 5  |
| RU3 | 12 | 10 | 2  | 14 |

TABLE 7.8

Resource sharing situation after the seventh frequency hopping (4 RUs, each of which carries at most 4 UEs)

|     | X0 | X1 | X2 | X3 |
|-----|----|----|----|----|
| RU0 | 7  | 3  | 13 | 12 |
| RU1 | 9  | 5  | 14 | 11 |
| RU2 | 4  | 2  | 15 | 8  |
| RU3 | 10 | 6  | 1  | 0  |

TABLE 7.9

Resource sharing situation after the eighth frequency hopping (4 RUs, each of which carries at most 4 UEs)

|     | X0 | X1 | X2 | X3 |
|-----|----|----|----|----|
| RU0 | 6  | 8  | 13 | 14 |
| RU1 | 7  | 1  | 5  | 2  |
| RU2 | 11 | 3  | 4  | 10 |
| RU3 | 15 | 9  | 0  | 12 |

TABLE 7.10

Resource sharing situation after the ninth frequency hopping (4 RUs, each of which carries at most 4 UEs)

|     | X0 | X1 | X2 | X3 |
|-----|----|----|----|----|
| RU0 | 9  | 10 | 1  | 14 |
| RU1 | 6  | 0  | 11 | 5  |
| RU2 | 2  | 8  | 12 | 3  |
| RU3 | 4  | 7  | 13 | 15 |

TABLE 7.11

Resource sharing situation after the tenth frequency hopping (4 RUs, each of which carries at most 4 UEs)

|     | X0 | X1 | X2 | X3 |
|-----|----|----|----|----|
| RU0 | 5  | 10 | 2  | 4  |
| RU1 | 12 | 6  | 15 | 14 |
| RU2 | 7  | 3  | 1  | 11 |
| RU3 | 9  | 13 | 0  | 8  |

TABLE 7.12

Resource sharing situation after the eleventh frequency hopping (4 RUs, each of which carries at most 4 UEs)

|     | X0 | X1 | X2 | X3 |
|-----|----|----|----|----|
| RU0 | 1  | 10 | 6  | 9  |
| RU1 | 13 | 12 | 7  | 4  |
| RU2 | 5  | 11 | 8  | 15 |
| RU3 | 14 | 0  | 2  | 3  |

TABLE 7.13

Resource sharing situation after the twelfth frequency hopping (4 RUs, each of which carries at most 4 UEs)

|     | X0 | X1 | X2 | X3 |
|-----|----|----|----|----|
| RU0 | 0  | 13 | 5  | 9  |
| RU1 | 1  | 15 | 3  | 7  |
| RU2 | 4  | 2  | 6  | 11 |
| RU3 | 8  | 10 | 12 | 14 |

As shown from Table 7.1 to Table 7.13, there is no recurrence of any one of collision relationships. If the deduction is continued according to this frequency hopping criterion, it can be found that there is still no exactly the same situation as the initial resource sharing situation before the frequency hopping at the $200^{th}$ frequency hopping.

Embodiment 8

Table 8.1 shows an initial scheduling distribution in which there are 4 RUs, each of which carries at most 2 UEs. $UE_0$ and $UE_1$ are carried on $RU_0$. $UE_2$ and $UE_3$ are carried on $RU_1$. $UE_4$ and $UE_5$ are carried on $RU_2$. $UE_6$ and $UE_7$ are carried on $RU_3$. As shown in Table 8.1, the values of identification information parameters X used by the UEs, namely, $UE_0$, $UE_2$, $UE_4$ and $UE_6$ which are on the different RUs but in the same column are the same. Actually, some of the UEs may not exist. If some UEs do not exist actually, hopping operations of other actually existing UEs are unaffected.

TABLE 8.1

Initial resource sharing situation before frequency hopping
(4 RUs, each of which carries at most 2 UEs)

|     | X0 | X1 |
| --- | --- | --- |
| RU0 | 0 | 1 |
| RU1 | 2 | 3 |
| RU2 | 4 | 5 |
| RU3 | 6 | 7 |

Here, the number of RUs is N=4, and the maximum number of UEs carried by each RU is M=2. According to a criterion shown in Equations 8.1 and 8.2, a resource sharing situation after the first frequency hopping is calculated based on the initial resource sharing situation shown in Table 8.1, then a resource sharing situation after the second frequency hopping is calculated based on the resource sharing situation after the first frequency hopping, and so on a resource sharing situation after the twelfth frequency hopping is calculated, as shown from Table 8.2 to Table 8.13. Based on this criterion, X parameters used by each of the UEs are changeable.

$$x_{k,r} = \mathrm{mod}(x_{k,r-1} + y_{k,r-1} + \Delta x_{init}, M) \quad (8.1); \text{ and}$$

$$y_{k,r} = \mathrm{mod}(y_{k,r-1} + \Delta y(x_{k,r}) + \Delta y_{init}, N) \quad (8.2).$$

Here, $\Delta y$ is a sequence formed by random rearrangement of a sequence $[0, 1, \ldots, M-1]$; and $\Delta y(x_{k,r})$ is the $(x_{k,r})$-th element in the sequence $\Delta y$. $\Delta x_{init} = 0$, and $\Delta y_{init} = 0$.

TABLE 8.2

Resource sharing situation after the first frequency hopping
(4 RUs, each of which carries at most 2 UEs)

|     | X0 | X1 |
| --- | --- | --- |
| RU0 | 0 | 5 |
| RU1 | 3 | 6 |
| RU2 | 4 | 1 |
| RU3 | 7 | 2 |

TABLE 8.3

Resource sharing situation after the second frequency hopping
(4 RUs, each of which carries at most 2 UEs)

|     | X0 | X1 |
| --- | --- | --- |
| RU0 | 0 | 7 |
| RU1 | 6 | 5 |
| RU2 | 4 | 3 |
| RU3 | 2 | 1 |

TABLE 8.4

Resource sharing situation after the third frequency hopping
(4 RUs, each of which carries at most 2 UEs)

|     | X0 | X1 |
| --- | --- | --- |
| RU0 | 5 | 2 |
| RU1 | 4 | 7 |
| RU2 | 1 | 6 |
| RU3 | 0 | 3 |

TABLE 8.5

Resource sharing situation after the fourth frequency hopping
(4 RUs, each of which carries at most 2 UEs)

|     | X0 | X1 |
| --- | --- | --- |
| RU0 | 5 | 0 |
| RU1 | 7 | 2 |
| RU2 | 1 | 4 |
| RU3 | 3 | 6 |

TABLE 8.6

Resource sharing situation after the fifth frequency hopping (4 RUs, each of which carries at most 2 UEs)

|     | X0 | X1 |
| --- | --- | --- |
| RU0 | 6 | 7 |
| RU1 | 5 | 4 |
| RU2 | 2 | 3 |
| RU3 | 1 | 0 |

TABLE 8.7

Resource sharing situation after the sixth frequency hopping (4 RUs, each of which carries at most 2 UEs)

|     | X0 | X1 |
| --- | --- | --- |
| RU0 | 4 | 1 |
| RU1 | 2 | 7 |
| RU2 | 0 | 5 |
| RU3 | 6 | 3 |

TABLE 8.8

Resource sharing situation after the seventh frequency hopping (4 RUs, each of which carries at most 2 UEs)

|     | X0 | X1 |
| --- | --- | --- |
| RU0 | 0 | 2 |
| RU1 | 3 | 5 |
| RU2 | 4 | 6 |
| RU3 | 7 | 1 |

TABLE 8.9

Resource sharing situation after the eighth frequency hopping (4 RUs, each of which carries at most 2 UEs)

|     | X0 | X1 |
| --- | --- | --- |
| RU0 | 1 | 6 |
| RU1 | 0 | 7 |
| RU2 | 5 | 2 |
| RU3 | 4 | 3 |

TABLE 8.10

Resource sharing situation after the ninth frequency hopping (4 RUs, each of which carries at most 2 UEs)

|     | X0 | X1 |
| --- | --- | --- |
| RU0 | 1 | 0 |
| RU1 | 7 | 2 |

TABLE 8.10-continued

Resource sharing situation after the ninth frequency hopping (4 RUs, each of which carries at most 2 UEs)

|     | X0 | X1 |
|-----|----|----|
| RU2 | 5  | 4  |
| RU3 | 3  | 6  |

TABLE 8.11

Resource sharing situation after the tenth frequency hopping (4 RUs, each of which carries at most 2 UEs)

|     | X0 | X1 |
|-----|----|----|
| RU0 | 1  | 7  |
| RU1 | 2  | 4  |
| RU2 | 5  | 3  |
| RU3 | 6  | 0  |

TABLE 8.12

Resource sharing situation after the eleventh frequency hopping (4 RUs, each of which carries at most 2 UEs)

|     | X0 | X1 |
|-----|----|----|
| RU0 | 4  | 6  |
| RU1 | 5  | 7  |
| RU2 | 0  | 2  |
| RU3 | 1  | 3  |

TABLE 8.13

Resource sharing situation after the twelfth frequency hopping (4 RUs, each of which carries at most 2 UEs)

|     | X0 | X1 |
|-----|----|----|
| RU0 | 4  | 5  |
| RU1 | 7  | 2  |
| RU2 | 0  | 1  |
| RU3 | 3  | 6  |

It can be seen from Table 8.1 to Table 8.13 that there is no resource sharing situation that is exactly the same as the initial resource sharing situation before frequency hopping till the twelfth frequency hopping. If the deduction is continued according to this frequency hopping criterion, the resource sharing situation after the forty-third frequency hopping can be exactly the same as that after the twenty-fifth frequency hopping.

The function based hopping rule is explained in detail through the above embodiments. Further, in other embodiments of the present disclosure, the hopping rule may also be described based on an orthogonal Latin square or a Latin square.

Optionally, the orthogonal Latin square based hopping rule may include: in an L-order orthogonal Latin square G, a UE which has the identification information parameter value of l and which is located on the k-th resource unit (RU) is allocated to the m-th RU after the hopping, and an identification information parameter value of the UE is set to be n, wherein (m, n) is an element in the k-th row and the l-th column of the L-order orthogonal Latin square G; and $1 \leq k, l, m, n \leq L$.

Embodiment 9

Table 9.1 shows an initial scheduling distribution in which there are 4 RUs, each of which carries at most 4 UEs. $UE_0$, $UE_1$, $UE_2$, and $UE_3$ are carried on $RU_0$. $UE_4$, $UE_5$, $UE_6$ and $UE_7$ are carried on $RU_1$. $UE_8$, $UE_9$, $UE_{10}$ and $UE_{11}$ are carried on $RU_2$. $UE_{12}$, $UE_{13}$, $UE_{14}$ and $UE_{15}$ are carried on $RU_3$. As shown in Table 9.1, the values of identification information parameters X used by the UEs, namely, $UE_0$, $UE_4$, $UE_8$ and $UE_{12}$ which are on the different RUs but in the same column are the same. Actually, some of the UEs may not exist. If some UEs do not exist actually, hopping operations of other actually existing UEs are unaffected.

TABLE 9.1

Initial resource sharing situation before frequency hopping (4 RUs, each of which carries at most 4 UEs)

|     | X0 | X1 | X2 | X3 |
|-----|----|----|----|----|
| RU0 | 0  | 1  | 2  | 3  |
| RU1 | 4  | 5  | 6  | 7  |
| RU2 | 8  | 9  | 10 | 11 |
| RU3 | 12 | 13 | 14 | 15 |

Here, the number of RUs is N=4, and the maximum number of UEs carried by each RU is M=4. Frequency hopping is performed according to the orthogonal Latin square shown in Table 9.2.

TABLE 9.2

Four-order orthogonal Latin square

| (0, 0) | (1, 1) | (2, 2) | (3, 3) |
| (3, 1) | (2, 0) | (1, 3) | (0, 2) |
| (2, 3) | (3, 2) | (0, 1) | (1, 0) |
| (1, 2) | (0, 3) | (3, 0) | (2, 1) |

According to an element $(m_1, n_1)$ in the $k_1$-th row and the $l_1$-th column in Table 9.2, the UE currently located on the $k_1$-th RU and having the X parameter value $l_1$ is jumped to a position on the $m_1$-th RU and having the X parameter value $n_1$. At the second frequency hopping, according to an element $(k_2, l_2)$ in the $m_1$-th row and the $n_1$-th column in Table 9.2, the UE located on the $m_1$-th RU and having the X parameter value $n_1$ is jumped to a position on the $k_2$-th RU and having the X parameter value $l_2$. At the third frequency hopping, according to the element $(m_2, n_2)$ in the $k_2$-th row and the $l_2$-th column in Table 9.2, the UE located on the $k_2$-th RU and having the X parameter value $l_2$ is jumped to a position on the $m_2$-th RU and having the X parameter value $n_2$. And so on, frequency hopping based on the orthogonal Latin square shown in Table 9.2 is realized.

TABLE 9.3

Resource sharing situation after the first frequency hopping (4 RUs, each of which carries at most 4 UEs)

|     | X0 | X1 | X2 | X3 |
|-----|----|----|----|----|
| RU0 | 0  | 10 | 7  | 13 |
| RU1 | 11 | 1  | 12 | 6  |
| RU2 | 5  | 15 | 2  | 8  |
| RU3 | 14 | 4  | 9  | 3  |

TABLE 9.4

Resource sharing situation after the second frequency hopping (4 RUs, each of which carries at most 4 UEs)

|     | X0 | X1 | X2 | X3 |
|-----|----|----|----|----|
| RU0 | 0  | 2  | 6  | 4  |
| RU1 | 8  | 10 | 14 | 12 |
| RU2 | 1  | 3  | 7  | 5  |
| RU3 | 9  | 11 | 15 | 13 |

TABLE 9.5

Resource sharing situation after the third frequency hopping (4 RUs, each of which carries at most 4 UEs)

|     | X0 | X1 | X2 | X3 |
|-----|----|----|----|----|
| RU0 | 0  | 7  | 12 | 11 |
| RU1 | 5  | 2  | 9  | 14 |
| RU2 | 10 | 13 | 6  | 1  |
| RU3 | 15 | 8  | 3  | 4  |

TABLE 9.6

Resource sharing situation after the fourth frequency hopping (4 RUs, each of which carries at most 4 UEs)

|     | X0 | X1 | X2 | X3 |
|-----|----|----|----|----|
| RU0 | 0  | 6  | 14 | 8  |
| RU1 | 1  | 7  | 15 | 9  |
| RU2 | 2  | 4  | 12 | 10 |
| RU3 | 3  | 5  | 13 | 11 |

TABLE 9.7

Resource sharing situation after the fifth frequency hopping (4 RUs, each of which carries at most 4 UEs)

|     | X0 | X1 | X2 | X3 |
|-----|----|----|----|----|
| RU0 | 0  | 12 | 9  | 5  |
| RU1 | 10 | 6  | 3  | 15 |
| RU2 | 7  | 11 | 14 | 2  |
| RU3 | 13 | 1  | 4  | 8  |

TABLE 9.8

Resource sharing situation after the sixth frequency hopping (4 RUs, each of which carries at most 4 UEs)

|     | X0 | X1 | X2 | X3 |
|-----|----|----|----|----|
| RU0 | 0  | 14 | 15 | 1  |
| RU1 | 2  | 12 | 13 | 3  |
| RU2 | 6  | 8  | 9  | 7  |
| RU3 | 4  | 10 | 11 | 5  |

TABLE 9.9

Resource sharing situation after the seventh frequency hopping (4 RUs, each of which carries at most 4 UEs)

|     | X0 | X1 | X2 | X3 |
|-----|----|----|----|----|
| RU0 | 0  | 9  | 3  | 10 |
| RU1 | 7  | 14 | 4  | 13 |
| RU2 | 12 | 5  | 15 | 6  |
| RU3 | 11 | 2  | 8  | 1  |

TABLE 9.10

Resource sharing situation after the eighth frequency hopping (4 RUs, each of which carries at most 4 UEs)

|     | X0 | X1 | X2 | X3 |
|-----|----|----|----|----|
| RU0 | 0  | 15 | 13 | 2  |
| RU1 | 6  | 9  | 11 | 4  |
| RU2 | 14 | 1  | 3  | 12 |
| RU3 | 8  | 7  | 5  | 10 |

TABLE 9.11

Resource sharing situation after the ninth frequency hopping (4 RUs, each of which carries at most 4 UEs)

|     | X0 | X1 | X2 | X3 |
|-----|----|----|----|----|
| RU0 | 0  | 3  | 4  | 7  |
| RU1 | 12 | 15 | 8  | 11 |
| RU2 | 9  | 10 | 13 | 14 |
| RU3 | 5  | 6  | 1  | 2  |

TABLE 9.12

Resource sharing situation after the tenth frequency hopping (4 RUs, each of which carries at most 4 UEs)

|     | X0 | X1 | X2 | X3 |
|-----|----|----|----|----|
| RU0 | 0  | 13 | 11 | 6  |
| RU1 | 14 | 3  | 5  | 8  |
| RU2 | 15 | 2  | 4  | 9  |
| RU3 | 1  | 12 | 10 | 7  |

TABLE 9.13

Resource sharing situation after the eleventh frequency hopping (4 RUs, each of which carries at most 4 UEs)

|     | X0 | X1 | X2 | X3 |
|-----|----|----|----|----|
| RU0 | 0  | 4  | 8  | 12 |
| RU1 | 9  | 13 | 1  | 5  |
| RU2 | 3  | 7  | 11 | 15 |
| RU3 | 10 | 14 | 2  | 6  |

TABLE 9.14

Resource sharing situation after the twelfth frequency hopping (4 RUs, each of which carries at most 4 UEs)

|     | X0 | X1 | X2 | X3 |
|-----|----|----|----|----|
| RU0 | 0  | 11 | 5  | 14 |
| RU1 | 15 | 4  | 10 | 1  |
| RU2 | 13 | 6  | 8  | 3  |
| RU3 | 2  | 9  | 7  | 12 |

TABLE 9.15

Resource sharing situation after the thirteenth frequency hopping
(4 RUs, each of which carries at most 4 UEs)

|     | X0 | X1 | X2 | X3 |
| --- | --- | --- | --- | --- |
| RU0 | 0 | 8 | 1 | 9 |
| RU1 | 3 | 11 | 2 | 10 |
| RU2 | 4 | 12 | 5 | 13 |
| RU3 | 7 | 15 | 6 | 14 |

TABLE 9.16

Resource sharing situation after the fourteenth frequency hopping
(4 RUs, each of which carries at most 4 UEs)

|     | X0 | X1 | X2 | X3 |
| --- | --- | --- | --- | --- |
| RU0 | 0 | 5 | 10 | 15 |
| RU1 | 13 | 8 | 7 | 2 |
| RU2 | 11 | 14 | 1 | 4 |
| RU3 | 6 | 3 | 12 | 9 |

TABLE 9.17

Resource sharing situation after the fifteenth frequency hopping
(4 RUs, each of which carries at most 4 UEs)

|     | X0 | X1 | X2 | X3 |
| --- | --- | --- | --- | --- |
| RU0 | 0 | 1 | 2 | 3 |
| RU1 | 4 | 5 | 6 | 7 |
| RU2 | 8 | 9 | 10 | 11 |
| RU3 | 12 | 13 | 14 | 15 |

It can be seen from Table 9.1 and Table 9.17 that the initial scheduling state appears again in the resource sharing situation after the fifteenth frequency hopping. Thus, based on the frequency hopping criterion, a change cycle of the frequency hopping resource sharing situation is 15.

Embodiment 10

Table 10.1 shows an initial scheduling distribution in which there are 4 RUs, each of which carries at most 2 UEs. $UE_0$ and $UE_1$ are carried on $RU_0$. $UE_2$ and $UE_3$ are carried on $RU_1$. $UE_4$ and $UE_5$ are carried on $RU_2$. $UE_6$ and $UE_7$ are carried on $RU_3$. As shown in Table 10.1, the values of identification information parameters X used by the UEs such as $UE_0$ and $UE_2$ which are on the different RUs but in the same column are the same. Actually, some of the UEs may not exist. If some UEs do not exist actually, hopping operations of other actually existing UEs are unaffected.

TABLE 10.1

Initial resource sharing situation before frequency hopping
(4 RUs, each of which carries at most 2 UEs)

|     | X0 | X1 |
| --- | --- | --- |
| RU0 | 0 | 1 |
| RU1 | 2 | 3 |
| RU2 | 4 | 5 |
| RU3 | 6 | 7 |

Here, the number of RUs is N=4, and the maximum number of UEs carried by each RU is M=2. Frequency hopping is performed according to the orthogonal Latin square shown in Table 10.2.

TABLE 10.2

Frequency hopping pattern

| | |
| --- | --- |
| (1, 1) | (2, 2) |
| (2, 0) | (1, 3) |
| (3, 2) | (0, 1) |
| (0, 3) | (3, 0) |

Table 10.2 is a frequency hopping pattern formed by the second and third columns extracted from the orthogonal Latin square pattern shown in Table 9.1. A resource sharing situation after the first frequency hopping is obtained based on Table 10.2, as shown in Table 10.3.

TABLE 10.3

Resource sharing situation after the first frequency hopping
(4 RUs, each of which carries at most 2 UEs)

|     | X0 | X1 | X2 | X3 |
| --- | --- | --- | --- | --- |
| RU0 |   | 5 |   | 6 |
| RU1 |   | 0 |   | 3 |
| RU2 | 2 |   | 1 |   |
| RU3 | 7 |   | 4 |   |

Optionally, since only two UEs are carried on each resource unit, when the frequency hopping operation is performed, a resource that is not occupied by the UE can be regarded as a special resource, and is subjected to frequency hopping according to the same rule as other occupied resource units. Or, Table 10.3 can be sorted out as long as the two UEs can be distinguished. The sorted Table 10.3 can be as shown in Table 10.4.

TABLE 10.4

Resource sharing situation after the first frequency hopping
(4 RUs, each of which carries at most 2 UEs)

|     | X0 | X1 |
| --- | --- | --- |
| RU0 | 5 | 6 |
| RU1 | 0 | 3 |
| RU2 | 2 | 1 |
| RU3 | 7 | 4 |

In accordance with the above manner, the following resource sharing situations are obtained in turn.

TABLE 10.5

Resource sharing situation after the second frequency hopping
(4 RUs, each of which carries at most 2 UEs)

|     | X0 | X1 |
| --- | --- | --- |
| RU0 | 1 | 7 |
| RU1 | 5 | 3 |
| RU2 | 0 | 6 |
| RU3 | 4 | 2 |

TABLE 10.6

Resource sharing situation after the third frequency hopping (4 RUs, each of which carries at most 2 UEs)

|     | X0 | X1 |
| --- | --- | --- |
| RU0 | 6 | 4 |
| RU1 | 1 | 3 |

TABLE 10.6-continued

Resource sharing situation after the third frequency hopping (4 RUs, each of which carries at most 2 UEs)

|     | X0 | X1 |
| --- | --- | --- |
| RU2 | 5 | 7 |
| RU3 | 2 | 0 |

TABLE 10.7

Resource sharing situation after the fourth frequency hopping (4 RUs, each of which carries at most 2 UEs)

|     | X0 | X1 |
| --- | --- | --- |
| RU0 | 7 | 2 |
| RU1 | 6 | 3 |
| RU2 | 1 | 4 |
| RU3 | 0 | 5 |

TABLE 10.8

Resource sharing situation after the fifth frequency hopping (4 RUs, each of which carries at most 2 UEs)

|     | X0 | X1 |
| --- | --- | --- |
| RU0 | 4 | 0 |
| RU1 | 7 | 3 |
| RU2 | 6 | 2 |
| RU3 | 5 | 1 |

TABLE 10.9

Resource sharing situation after the sixth frequency hopping (4 RUs, each of which carries at most 2 UEs)

|     | X0 | X1 |
| --- | --- | --- |
| RU0 | 2 | 5 |
| RU1 | 4 | 3 |
| RU2 | 7 | 0 |
| RU3 | 1 | 6 |

TABLE 10.10

Resource sharing situation after the seventh frequency hopping (4 RUs, each of which carries at most 2 UEs)

|     | X0 | X1 |
| --- | --- | --- |
| RU0 | 0 | 1 |
| RU1 | 2 | 3 |
| RU2 | 4 | 5 |
| RU3 | 6 | 7 |

As shown in Table 10.10 and Table 10.1, the resource sharing situation after the seventh frequency hopping is the same as the initial state before the frequency hopping. In this frequency hopping cycle, there is no repeated collision relationship of the UEs.

In another embodiment of the present disclosure, the Latin square based hopping rule includes the following.

Each of the UEs has a dedicated frequency hopping pattern, wherein N frequency hopping patterns of at least one group of UEs superimposed on each other can form an N-order Latin square.

Embodiment 11

Table 11.1 shows an initial scheduling distribution in which there are 4 RUs, each of which carries at most 4 UEs. $UE_0$, $UE_1$, $UE_2$, and $UE_3$ are carried on $RU_0$. $UE_4$, $UE_5$, $UE_6$ and $UE_7$ are carried on $RU_1$. $UE_8$, $UE_9$, $UE_{10}$ and $UE_{11}$ are carried on $RU_2$. $UE_{12}$, $UE_{13}$, $UE_{14}$ and $UE_{15}$ are carried on $RU_3$. Thus, 4 RUs can carry at most 16 UEs. Actually, some of the UEs may not exist. If some UEs do not exist actually, hopping operations of other actually existing UEs are unaffected.

TABLE 11.1

Initial resource sharing situation before frequency hopping (4 RUs, each of which carries at most 4 UEs)

| RU0 | 0 | 1 | 2 | 3 |
| --- | --- | --- | --- | --- |
| RU1 | 4 | 5 | 6 | 7 |
| RU2 | 8 | 9 | 10 | 11 |
| RU3 | 12 | 13 | 14 | 15 |

A frequency hopping scheme with a resource sharing change cycle of 4 is allocated to each of the 16 UEs. Each UE performs frequency hopping according to its frequency hopping pattern. The frequency hopping patterns of the 16 UEs are shown in FIG. 3.

Based on the frequency hopping patterns shown in FIG. 3, the resource sharing situations after the frequency hopping in turn can be inferred as shown from Table 11.2 to Table 11.5.

TABLE 11.2

Resource sharing situation after the first frequency hopping (4 RUs, each of which carries at most 4 UEs)

| RU0 | 4 | 13 | 10 | 3 |
| --- | --- | --- | --- | --- |
| RU1 | 0 | 9 | 14 | 7 |
| RU2 | 12 | 5 | 2 | 11 |
| RU3 | 8 | 1 | 6 | 15 |

TABLE 11.3

Resource sharing situation after the second frequency hopping (4 RUs, each of which carries at most 4 UEs)

| RU0 | 8 | 5 | 14 | 3 |
| --- | --- | --- | --- | --- |
| RU1 | 12 | 1 | 10 | 7 |
| RU2 | 0 | 13 | 6 | 11 |
| RU3 | 4 | 9 | 2 | 15 |

TABLE 11.4

Resource sharing situation after the third frequency hopping (4 RUs, each of which carries at most 4 UEs)

| RU0 | 12 | 9 | 6 | 3 |
| --- | --- | --- | --- | --- |
| RU1 | 8 | 13 | 2 | 7 |
| RU2 | 4 | 1 | 14 | 11 |
| RU3 | 0 | 5 | 10 | 15 |

TABLE 11.5

Resource sharing situation after the fourth frequency hopping (4 RUs, each of which carries at most 4 UEs)

| RU0 | 0 | 1 | 2 | 3 |
| --- | --- | --- | --- | --- |
| RU1 | 4 | 5 | 6 | 7 |

TABLE 11.5-continued

Resource sharing situation after the fourth frequency hopping (4 RUs, each of which carries at most 4 UEs)

| RU2 | 8  | 9  | 10 | 11 |
| --- | -- | -- | -- | -- |
| RU3 | 12 | 13 | 14 | 15 |

According to Table 11.1 to Table 11.5, it can be seen that the frequency hopping state cycle based on this criterion is 4. That is, after every 4 times of frequency hopping, the frequency hopping state is repeated. Based on this criterion, randomization of the collision relationships is realized to the greatest extent when the frequency hopping cycle is 4.

Embodiment 12

Table 12.1 shows an initial scheduling distribution in which there are 4 RUs, each of which carries at most 2 UEs. $UE_0$ and $UE_1$ are carried on $RU_0$. $UE_2$ and $UE_3$ are carried on $RU_1$. $UE_4$ and $UE_5$ are carried on $RU_2$. $UE_6$ and $UE_7$ are carried on $RU_3$, as shown in Table 12.1. Actually, some of the UEs may not exist. If some UEs do not exist actually, hopping operations of other actually existing UEs are unaffected.

TABLE 12.1

Initial resource sharing situation before frequency hopping (4 RUs, each of which carries at most 2 UEs)

| RU0 | 0 | 1 |
| --- | - | - |
| RU1 | 2 | 3 |
| RU2 | 4 | 5 |
| RU3 | 6 | 7 |

Here, the number of RUs is N=4, and the maximum number of UEs carried by each RU is M=2. Each UE performs frequency hopping according to its frequency hopping pattern. The frequency hopping pattern of each UE is shown in FIG. 4. In this embodiment, FIG. 4 shows currently required frequency hopping patterns formed by two columns extracted from the 16 UEs hopping patterns shown in FIG. 3. Based on the frequency hopping pattern shown in FIG. 4, the resource sharing situations after the frequency hopping in turn can be inferred as shown from Table 12.2 to Table 12.5.

TABLE 12.2

Resource sharing situation after the first frequency hopping (4 RUs, each of which carries at most 2 UEs)

| RU0 | 2 | 5 |
| --- | - | - |
| RU1 | 0 | 7 |
| RU2 | 6 | 1 |
| RU3 | 4 | 3 |

TABLE 12.3

Resource sharing situation after the second frequency hopping (4 RUs, each of which carries at most 2 UEs)

| RU0 | 4 | 7 |
| --- | - | - |
| RU1 | 6 | 5 |
| RU2 | 0 | 3 |
| RU3 | 2 | 1 |

TABLE 12.4

Resource sharing situation after the third frequency hopping (4 RUs, each of which carries at most 2 UEs)

| RU0 | 6 | 3 |
| --- | - | - |
| RU1 | 4 | 1 |
| RU2 | 2 | 7 |
| RU3 | 0 | 5 |

TABLE 12.5

Resource sharing situation after the fourth frequency hopping (4 RUs, each of which carries at most 2 UEs)

| RU0 | 0 | 1 |
| --- | - | - |
| RU1 | 2 | 3 |
| RU2 | 4 | 5 |
| RU3 | 6 | 7 |

According to Table 12.1 to Table 12.5, it can be seen that the frequency hopping state cycle based on this criterion is 4. That is, after every 4 times of frequency hopping, the frequency hopping state is repeated. Based on this criterion, randomization of the collision relationships is realized to the greatest extent when the frequency hopping cycle is 4.

Figure 5:
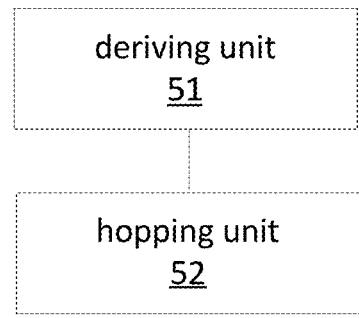
FIG. 5 is a schematic structural diagram of a transmission resource determining device provided by an embodiment of the present disclosure.

Correspondingly, as shown in FIG. 5, an embodiment of the present disclosure provides a transmission resource determining device, which includes the following units.

A deriving unit 51 is configured to enable a user equipment to derive a hopping rule of a used transmission resource, wherein in the hopping rule, the transmission resource used after a current hopping is associated with at least two of: frequency domain information corresponding to a physical resource used in the latest transmission, time domain information of the latest transmission, and identification information used in the latest transmission; and the identification information is used to distinguish a plurality of user equipments using the same resource for information transmission.

A hopping unit 52 is configured to enable the user equipment performs a corresponding transmission resource hopping at a preset time interval according to the hopping rule.

In the transmission resource determining device provided by the embodiment of the present disclosure, which transmission resource each of the user equipments jumps to is only related to a frequency domain resource, a time domain resource or an identification resource used before the hopping. Thus, a collision probability when a plurality of user equipments perform resource hopping is effectively reduced, and user equipment signals having obviously different signal-to-noise ratios can be transmitted on the same resource block more easily. A collision relationship of the user equipment signals is periodically adjusted by periodically adjusting frequency domain resources of all of accessed user equipments, so that a receiver at a base station side has an opportunity to effectively demodulate the signals based on a more suitable combined collision relationship of the user equipments.

In an implementation, each of the user equipments can determine a hopping rule of the transmission resource with a base station that the user equipment corresponds to. After both the user equipment and the base station derive the corresponding hopping rule, the user equipment can perform transmission resource hopping according to the corresponding rule.

In an implementation, the frequency domain information corresponding to the physical resource used in the latest transmission includes a resource unit sequence number used in the latest transmission. The time domain information of the latest transmission includes a sub-frame sequence number at the latest transmission, or a time slot sequence number at the latest transmission, or a symbol sequence number at the latest transmission, or the number of resource hopping times. The identification information used in the latest transmission includes sequence coding information or power intensity information used in the latest transmission. The sequence coding information may include pilot sequence information and/or spreading sequence information.

In an implementation, the hopping rule may include one or more of following rules: a function based hopping rule, an orthogonal Latin square based hopping rule, and a Latin square based hopping rule.

It is assumed that in a communication system, there are N RUs, including $RU_0, RU_1, \ldots,$ and $RU_{N-1}$ can be scheduled, M UEs are scheduled on the N RUs, and each of the scheduled $UE_0, UE_1, \ldots,$ and $UE_{M-1}$ performs frequency hopping every $\Delta t$ time.

In an implementation, the function based hopping rule includes:

$$y_{k,r}=F(y_{k,r-1},x_{k,r-1},r) \qquad (1); \text{ and}$$

$$x_{k,r}=G(y_{k,r-1},x_{k,r-1},r) \qquad (2).$$

Here, k is a sequence number of the user equipment (UE), r is a positive integer greater than or equal to 1, and $y_{k,r}$ is a sequence number of a frequency domain resource to which the $UE_k$ jumps for the r-th time; $x_{k,r}$ is a sequence number of identification information after the $UE_k$ jumps for the r-th time; $y_{k,0}$ indicates a sequence number of a frequency domain resource initially used by the $UE_k$; and $x_{k,0}$ is a sequence number of identification information initially used by the $UE_k$.

In an implementation, $F(y_{k,r-1},x_{k,r-1},r)$ is a modulo function; and $G(y_{k,r-1},k_{k,r-1},r)$ is a modulo function or a constant.

In an implementation, $x_{k,r}=\mod(x_{k,r-1}+\Delta x_{k,r},M)$ or $x_{k,r}=x_{k,r-1}$; and $$y_{k,r}=\mod(y_{k,r-1}+\Delta y_{k,r},N).$$

Here, the operator mod represents a modulo operation; $x_{k,r}$ is obtained by performing, by $x_{k,r-1}+\Delta x_{k,r}$, the modulo operation on M, or is equal to $x_{k,r-1}$; $y_{k,r}$ is obtained by performing, by $y_{k,r-1}+\Delta y_{k,r}$, the modulo operation on N; $\Delta x_{k,r}$ is a moving step length from $x_{k,r-1}$ to $x_{k,r}$; $\Delta y_{k,r}$ is a moving step length from $y_{k,r-1}$ to $y_{k,r}$; N is the number of resource units; and M is the maximum number of the user equipments that each resource unit can carry.

Optionally, the function based hopping rule may include:

$$x_{k,r}=x_{k,r-1} \qquad (6); \text{ and}$$

$$y_{k,r}=\mod(y_{k,r-1}+x_{k,r}+r-1+\Delta y_{init},N) \qquad (7).$$

Where $\Delta y_{init}$ is a preset offset, and is an integer greater than or equal to zero.

In an implementation, the function based hopping rule may include:

$$x_{k,r}=\mod(x_{k,r-1}+y_{k,r-1}+\Delta x_{init},M) \qquad (8); \text{ and}$$

$$y_{k,r}=\mod(y_{k,r-1}+x_{k,r}+r-1+\Delta y_{init},N) \qquad (9).$$

Where $\Delta x_{init}$ and $\Delta y_{init}$ are preset offsets, and are integers greater than or equal to zero.

In an implementation, the function based hopping rule may include:

$$x_{k,r}=\mod(x_{k,r-1}+y_{k,r-1}*\lfloor r/N \rfloor+\Delta x_{init},M) \qquad (10); \text{ and}$$

$$y_{k,r}=\mod(y_{k,r-1}+x_{k,r}+r-1+\Delta y_{init},N) \qquad (11).$$

Where $\lfloor \ \rfloor$ indicates rounding down to an integer; and $\Delta x_{init}$ and $\Delta y_{init}$ are preset offsets, and are integers greater than or equal to zero.

In an implementation, the function based hopping rule may include:

$$x_{k,r}=\begin{cases} \mod(x_{k,r-1}+y_{k,r-1}+\Delta x_{init},M) & w=1 \\ x_{k,r-1} & w\neq 1 \end{cases} \qquad (12);$$

$$y_{k,r}=\begin{cases} \mod(y_{k,r-1}+x_{k,r}+r+\Delta y_{init},N) & w=1 \\ \mod(y_{k,r-1}+\mod(x_{k,r},w)+r+\Delta y_{init},N) & w\neq 1 \end{cases} \qquad (13);$$

and $$w=\mod(r,N). \qquad (14)$$

Where $\Delta x_{init}$, and $\Delta y_{init}$ are preset offsets, and integers greater than or equal to zero.

Optionally, the function based hopping rule may include:

$$x_{k,r}=\mod(x_{k,r-1}+y_{k,r-1}+\Delta x_{init},M) \qquad (15); \text{ and}$$

$$y_{k,r}=\mod(y_{k,r-1}+\Delta y(x_{k,r})+\Delta y_{init},N) \qquad (16).$$

Where $\Delta y$ is a sequence formed by random rearrangement of a sequence $[0, 1, \ldots, M-1]$; and $\Delta y(x_{k,r})$ is the $(x_{k,r})$-th element in the sequence $\Delta y$. $\Delta x_{init}$ and $\Delta y_{init}$ are preset offsets, are integers greater than or equal to zero, and keep constant in the whole hopping process.

In an implementation, the orthogonal Latin square based hopping rule includes the following.

In an L-order orthogonal Latin square G, UE which has the identification information parameter value of l and which is located on the k-th resource unit (RU) is allocated to the m-th RU after the hopping, and an identification information parameter value of the UE is set to be n, wherein (m, n) is an element in the k-th row and the l-th column of the L-order orthogonal Latin square G; and $1 \leq k,l,m, n \leq L$.

In an implementation, the Latin square based hopping rule includes the following.

Each of the UEs has a dedicated frequency hopping pattern, wherein N frequency hopping patterns of at least one group of UEs superimposed on each other can form an N-order Latin square.

Figure 6:
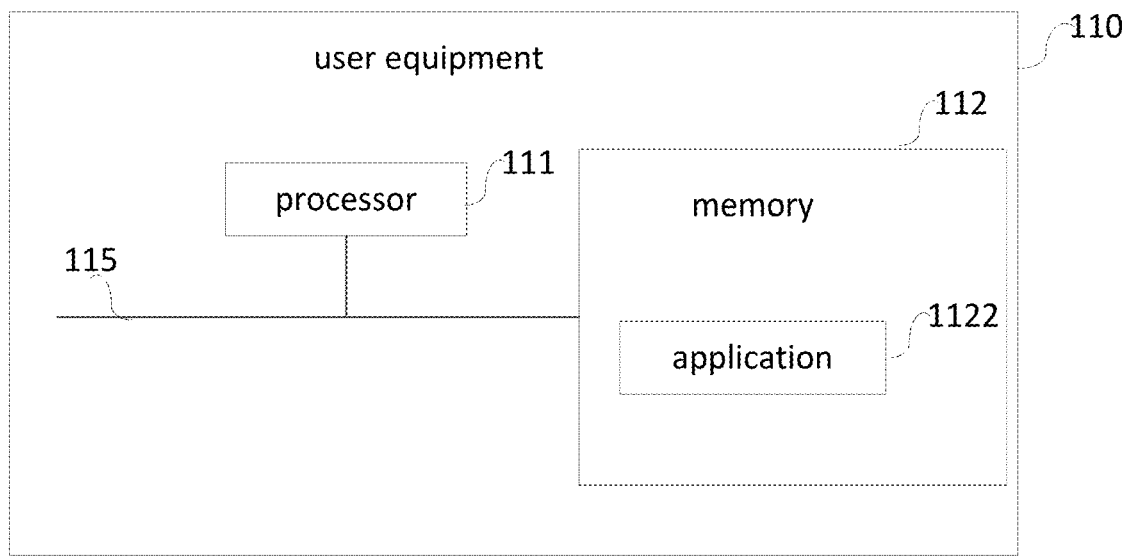
FIG. 6 is a schematic diagram of a hardware structure of a user equipment according to an embodiment of the present disclosure.

Correspondingly, an embodiment of the present disclosure further provides user equipment 110. A schematic diagram of a hardware structure of the user equipment is as shown in FIG. 6. The user equipment 110 includes a processor 111 for processing data, and a memory 112 configured to store data. The memory 112 is configured to store an instruction for implementing a transmission resource determining method; and the processor 111 is configured to execute the instruction stored in the memory 112. When the processor 111 executes the instruction stored in the memory 112, executing steps include: acquiring a hopping rule of a used transmission resource, wherein in the hopping rule, the transmission resource used after a current hopping is associated with at least two of: frequency domain information corresponding to a physical resource used in the latest transmission, time domain information of the latest transmission, and identification information used in the latest transmission, and the identification information is used to distinguish a plurality of user equipments using the same resource for information transmission; and performing a corresponding transmission resource hopping at a preset time interval according to the hopping rule.

In the user equipment provided by the embodiment of the present disclosure, which transmission resource each of the user equipments jumps to is only related to a frequency domain resource, a time domain resource or an identification resource used before the hopping. Thus, a collision probability when a plurality of user equipments perform resource hopping is effectively reduced, and user equipment signals having obviously different signal-to-noise ratios can be transmitted on the same resource block more easily. A collision relationship of the user equipment signals is periodically adjusted by periodically adjusting frequency domain resources of all of accessed user equipments, so that a receiver at a base station side has an opportunity to effectively demodulate the signals based on a more suitable combined collision relationship of the user equipments.

In an implementation, the frequency domain information corresponding to the physical resource used in the latest transmission includes a resource unit sequence number used in the latest transmission. The time domain information of the latest transmission includes a sub-frame sequence number at the latest transmission, or a time slot sequence number at the latest transmission, or a symbol sequence number at the latest transmission, or the number of resource hopping times. The identification information used in the latest transmission includes sequence coding information or power intensity information used in the latest transmission.

The sequence coding information includes pilot sequence information and/or spreading sequence information. Optionally, the hopping rule includes at least one of the following rules: a function based hopping rule, an orthogonal Latin square based hopping rule, and a Latin square based hopping rule.

In an implementation, the function based hopping rule includes:

$$y_{k,r} = F(y_{k,r-1}, x_{k,r-1}, r) \quad (1); \text{ and}$$

$$x_{k,r} = G(y_{k,r-1}, x_{k,r-1}, r) \quad (2).$$

Where k is a sequence number of the user equipment (UE), r is a positive integer greater than or equal to 1, and $y_{k,r}$ is a sequence number of a frequency domain resource to which the $UE_k$ jumps for the r-th time; $x_{k,r}$ is a sequence number of identification information after the $UE_k$ jumps for the r-th time; $y_{k,0}$ indicates a sequence number of a frequency domain resource initially used by the $UE_k$; and $x_{k,0}$ is a sequence number of identification information initially used by the $UE_k$. That is, $y_{k,r}$ is the sequence number of the frequency domain resource to which the scheduled $UE_k$ jumps for the r-th time; $y_{k,r-1}$ is the sequence number of a frequency domain resource to which the $UE_k$ jumps for the (r−1)-th time; $x_{k,r}$ is the sequence number of the identification information after the user equipment $UE_k$ jumps for the r-th time; and $x_{k,r-1}$ is a sequence number of identification information after the $UE_k$ jumps for the (r−1)-th time.

In an implementation, $F(y_{k,r-1}, x_{k,r-1}, r)$ is a modulo function; and $G(y_{k,r-1}, x_{k,r-1}, r)$ is a modulo function or a constant.

Various components in the user equipment 110 are coupled together through a bus system 115. It should be understood that the bus system 115 is used to implement connection communication between these components. The bus system 115 includes a power bus, a control bus, and a status signal bus in addition to a data bus. However, for clarity of description, all the buses are labeled as the bus system 115 in FIG. 6.

It should be understood that the memory 112 may be a volatile memory or a non-volatile memory, and may include both the volatile memory and the non-volatile memory. The non-volatile memory may be an ROM, a PROM (Programmable Read-Only Memory), an EPROM (Erasable Programmable Read-Only Memory), an EEPROM (Electrically Erasable Programmable Read-Only Memory), an FRAM (Ferromagnetic Random Access Memory), a flash memory, a magnetic surface memory, an optical disc, or a CD-ROM (Compact Disc Read-Only Memory). The magnetic surface memory may be a magnetic disc memory or a magnetic tape memory. The volatile memory may be an RAM (Random Access Memory), which is used as an external cache. By way of illustration and not limitation, RAM is available in many forms such as an SRAM (Static Random Access Memory), an SSRAM (Synchronous Static Random Access Memory), a DRAM (Dynamic Random Access Memory), an SDRAM (Synchronous Dynamic Random Access Memory), a DDRSDRAM (Double Data Rate Synchronous Dynamic Random Access Memory), an ESDRAM (Enhanced Synchronous Dynamic Random Access Memory), an SLDRAM (SyncLink Dynamic Random Access Memory), and a DRRAM (Direct Rambus Random Access Memory). The memory 112 described in the embodiments of the present disclosure is intended to include, but is not limited to, these and any other suitable types of memories.

The memory 112 in the embodiments of the present disclosure is used to store various types of data to support operations of the user equipment 110. Examples of such data include any computer program, such as an application 1122, which is operated on the user equipment 110. A program for implementing the method of the embodiments of the present disclosure may be included in the application 1122.

The method disclosed in the foregoing embodiments of the present disclosure may be applied to the processor 111 or be implemented by the processor 111. The processor 111 may be an integrated circuit chip with a signal processing capability. In an implementing process, each step of the above method may be completed by an integrated logic circuit of hardware or an instruction in a form of software in the processor 111. The processor 111 described above may be a general purpose processor, a digital signal processor (DSP), or an programmable logic device, a discrete gate or transistor logic device, a discrete hardware component, or the like. The processor 111 can implement or execute various methods, steps, and logic blocks disclosed in the embodiments of the present disclosure. The general purpose processor can be a microprocessor, or any conventional processor, or the like. The steps of the method disclosed in the embodiment of the present disclosure may be directly completed by a hardware decoding processor or by a combination of hardware and software modules in the decoding processor. The software module can be located in a storage medium located in the memory 112, and the processor 111 reads information in the memory 112 and completes the steps of the foregoing method in conjunction with hardware of the processor 111.

In an exemplary embodiment, the user equipment 110 may be implemented by one or more ASICs (Application Specific Integrated Circuits), a DSP, a PLD (Programmable Logic Device), a CPLD (Complex Programmable Logic Device), an FPGA, a general purpose processor, a controller, an MCU, an MPU, or other electronic components, so as to execute the above method.

The present disclosure is described with reference to the flowcharts and/or block diagrams of the method, the equipment (system) and the computer program product according to the embodiments of the present disclosure. It should be understood that each process and/or block in the flowcharts and/or block diagrams, and combinations of processes and/or blocks in the flowcharts and/or block diagrams, may be realized by computer program instructions.

These computer program instructions may be provided to a generate purpose computer, a special purpose computer, an embedded processor, or processors of programmable data processing equipment, so as to create a machine, such that a device for realizing functions designated in one or more processes in the flowcharts and/or in one or more blocks in the block diagrams, may be created by instructions performed by the computer or the processors of the programmable data processing equipment.

These computer program instructions may further be stored in a computer-readable memory that can boot a computer or programmable data processing equipment to work in a specific way, such that a manufactured product containing an instruction device may be created by the instructions stored in the computer-readable memory, and the instruction device realizes the functions designated in one or more processes in the flowcharts and/or in one or more blocks in the block diagrams.

These computer program instructions may further be loaded into a computer or programmable data processing equipment, such that a series of operating steps may be executed on the computer or the programmable data processing equipment, so as to generate processes realized by the computer. Therefore, steps for realizing the functions designated in one or more processes in the flowcharts and/or in one or more blocks in the block diagrams may be provided by the instructions executed on the computer or the programmable data processing equipment.

An embodiment of the present disclosure provides a storage medium on which a computer program is stored. When the computer program is operated by the processor, executing steps include: deriving a hopping rule of a used transmission resource, wherein in the hopping rule, a transmission resource used after a current hopping is associated with at least two of: frequency domain information corresponding to a physical resource used in the latest transmission, time domain information of the latest transmission, and identification information used in the latest transmission, and the identification information is used to distinguish a plurality of user equipments using the same resource for information transmission; and performing a corresponding transmission resource hopping at a preset time interval according to the hopping rule.

It should be noted that the terms "comprise/include", "contain", or any other variants in the text are intended to cover the nonexclusive containing, such that the processes, methods, articles or devices including a series of elements not only include those elements, but also include other unclearly listed elements, or also include the inherent elements of such processes, methods, articles or devices. Without more limitations, the element defined by the phrase "comprising/including a . . . " does not exclude the existence of other same elements in the process, method, article, or device that including such element.

Through the descriptions of the above embodiments, those skilled in the art can clearly know that the all embodiments can be implemented by software with a necessary universal hardware platform, and of course, also can be implemented by hardware; but in many cases, the former is a better implementation. Based on this understanding, naturally, the above technical schemes or the contribution to the related art may be embodied as a software product. The computer software product may be stored in a storage medium, such as an ROM/RAM, a magnetic disc, an optical disc or the like, and may include a plurality of instructions allowing terminal equipment (may be a cell phone, a computer, a server, an air conditioner, network equipment, or the like) to execute methods described by all embodiments of the present disclosure.

The above description is only the preferred embodiments of the present disclosure and is not intended to limit the patent scope of the present disclosure. Any equivalent structure or equivalent process modification used according to the content of the Description and accompanying drawings in the present disclosure, no matter whether it is directly or indirectly used in any other related technical field, should be included within the protection scope of the present disclosure.

INDUSTRIAL APPLICABILITY

The embodiments of the present disclosure provide a transmission resource determining method, including: deriving, by a user equipment, a hopping rule of a used transmission resource, wherein in the hopping rule, a transmission resource used after a current hopping is associated with at least two of: frequency domain information corresponding to a physical resource used in the latest transmission, time domain information of the latest transmission, and identification information used in the latest transmission, and the identification information is used to distinguish a plurality of user equipments using the same resource for information transmission; and performing, by the user equipment, a corresponding transmission resource hopping at a preset time interval according to the hopping rule. In this way, which transmission resource each of user equipments jumps to is only related to a frequency domain resource, a time domain resource or an identification resource used before the equipments. Thus, a collision probability when a plurality of user equipments perform resource equipments is effectively reduced, and user equipment signals having obviously different signal-to-noise ratios can be transmitted on the same resource block more easily. A collision relationship of the user equipment signals is periodically adjusted by periodically adjusting frequency domain resources of all of accessed user equipments, so that a receiver at a base station side has an opportunity to effectively demodulate the signals based on a more suitable combined collision relationship of the user equipments.

What is claimed is:

1. A transmission resource determining method, comprising:
   deriving, by a user equipment, a hopping rule of a used transmission resource, wherein in the hopping rule, the transmission resource used after a current hopping is associated with identification information used in the latest transmission, and is associated with at least one of: frequency domain information corresponding to a physical resource used in the latest transmission, and time domain information of the latest transmission, wherein the identification information is used to distinguish a plurality of user equipments using the same resource for information transmission; and
   performing, by the user equipment, a corresponding transmission resource hopping at a preset time interval according to the hopping rule.

2. The method according to claim 1, wherein
the frequency domain information corresponding to the physical resource used in the latest transmission comprises a resource unit sequence number used in the latest transmission;
the time domain information of the latest transmission comprises a sub-frame sequence number at the latest transmission, or a time slot sequence number at the latest transmission, or a symbol sequence number at the latest transmission, or the number of resource hopping times; and
the identification information used in the latest transmission comprises sequence coding information or power intensity information used in the latest transmission.

3. The method according to claim 2, wherein the sequence coding information comprises pilot sequence information and/or spreading sequence information.

4. The method according to claim 1, wherein the hopping rule comprises at least one of: a function based hopping rule, an orthogonal Latin square based hopping rule, and a Latin square based hopping rule.

5. The method according to claim 4, wherein the function based hopping rule comprises:

$$y_{k,r}=F(y_{k,r-1},x_{k,r-1},r); \text{ and}$$

$$x_{k,r}=G(y_{k,r-1},x_{k,r-1},r), \text{ wherein}$$

k is a sequence number of a user equipment (UE), r is a positive integer greater than or equal to 1, and $y_{k,r}$ is a sequence number of a frequency domain resource to which the $UE_k$ jumps for the r-th time; $x_{k,r}$ is a sequence number of identification information after the $UE_k$ jumps for the r-th time; $y_{k,0}$ indicates a sequence number of a frequency domain resource initially used by the $UE_k$; and $x_{k,0}$ is a sequence number of identification information initially used by the $UE_k$.

6. The method according to claim 5, wherein $F(y_{k,r-1}, x_{k,r-1},r)$ is a modulo function; and $G(y_{k,r-1},x_{k,r-1},r)$ is a modulo function or a constant.

7. The method according to claim 6, wherein $$x_{k,r}=\text{mod}(x_{k,r-1}+\Delta x_{k,r},M) \text{ or } x_{k,r}=x_{k,r-1}; \text{ and}$$

$$y_{k,r}=\text{mod}(y_{k,r-1}+\Delta y_{k,r},N), \text{ wherein}$$

the operator mod represents a modulo operation; $x_{k,r}$ is obtained by performing, by $x_{k,r-1}+\Delta x_{k,r}$, the modulo operation on M, or is equal to $x_{k,r-1}$; $y_{k,r}$ is obtained by performing, by $y_{k,r-1}+\Delta y_{k,r}$, the modulo operation on N; $\Delta x_{k,r}$ is a moving step length from $x_{k,r-1}$ to $x_{k,r}$; $\Delta y_{k,r}$ is a moving step length from $y_{k,r-1}$ to $y_{k,r}$; N is the number of resource units; and M is the maximum number of the user equipments that each resource unit is capable of carrying.

8. The method according to claim 7, wherein $$x_{k,r}=x_{k,r-1}; \text{ and}$$

$$y_{k,r}=\text{mod}(y_{k,r-1}+x_{k,r}+r-1+\Delta y_{init},N), \text{ wherein}$$

$\Delta y_{init}$ is a preset offset, and is an integer greater than or equal to zero.

9. The method according to claim 7, wherein $$x_{k,r}=\text{mod}(x_{k,r-1}+y_{k,r-1}+\Delta x_{init},M); \text{ and}$$

$$y_{k,r}=\text{mod}(y_{k,r-1}+x_{k,r}+r-1+\Delta y_{init},N), \text{ wherein}$$

$\Delta x_{init}$ and $\Delta y_{init}$ are preset offsets, and are integers greater than or equal to zero.

10. The method according to claim 7, wherein $$x_{k,r}=\text{mod}(x_{k,r-1}+y_{k,r-1}*\lfloor r/N \rfloor+\Delta x_{init},M); \text{ and}$$

$$y_{k,r}=\text{mod}(y_{k,r-1}+x_{k,r}+r-1+\Delta y_{init},N), \text{ wherein}$$

$\lfloor \ \rfloor$ indicates rounding down to an integer; and $\Delta x_{init}$ and $\Delta y_{init}$ are preset offsets, and are integers greater than or equal to zero.

11. The method according to claim 7, wherein $$x_{k,r} = \begin{cases} \text{mod}(x_{k,r-1}+y_{k,r-1}+\Delta x_{init},M) & w=1 \\ x_{k,r-1} & w \neq 1 \end{cases};$$

$$y_{k,r} = \begin{cases} \text{mod}(y_{k,r-1}+x_{k,r}+r+\Delta y_{init},N) & w=1 \\ \text{mod}(y_{k,r-1}+\text{mod}(x_{k,r},w)+r+\Delta y_{init},N) & w \neq 1 \end{cases}; \text{ and}$$

$$w=\text{mod}(r,N),$$

wherein
$\Delta x_{init}$ and $\Delta y_{init}$ are preset offsets, and are integers greater than or equal to zero.

12. The method according to claim 7, wherein $$x_{k,r}=\text{mod}(x_{k,r-1}+y_{k,r-1}+\Delta x_{init},M); \text{ and}$$

$$y_{k,r}=\text{mod}(y_{k,r-1}+\Delta y(x_{k,r})+\Delta y_{init},N), \text{ wherein}$$

$\Delta y$ is a sequence formed by random rearrangement of a sequence [0, 1, ..., M−1];
$\Delta y(x_{k,r})$ is the $(x_{k,r})$-th element in the sequence $\Delta y$; and $\Delta x_{init}$ and $\Delta y_{init}$ are preset offsets, and are integers greater than or equal to zero.

13. The method according to claim 4, wherein the orthogonal Latin square based hopping rule comprises:
in an L-order orthogonal Latin square G, a UE which has an identification information parameter value of l and which is located on the k-th resource unit (RU) is allocated to the m-th RU after a hopping, and the identification information parameter value of the UE is set to be n, wherein (m, n) is an element in the k-th row and the l-th column of the L-order orthogonal Latin square G; and 1≤k,l,m, n≤L.

14. The method according to claim 4, wherein the Latin square based hopping rule comprises:
each of the UEs has a dedicated frequency hopping pattern, wherein N frequency hopping patterns of at least one group of UEs superimposed on each other can form an N-order Latin square.

15. A transmission resource determining device, comprising:
a deriving unit configured to enable a user equipment to derive a hopping rule of a used transmission resource, wherein in the hopping rule, the transmission resource used after a current hopping is associated with identification information used in the latest transmission, and is associated with at least one of: frequency domain information corresponding to a physical resource used in the latest transmission, and time domain information of the latest transmission, wherein the identification information is configured to distinguish a plurality of user equipments using the same resource for information transmission; and
a hopping unit configured to enable the user equipment to perform a corresponding transmission resource hopping at a preset time interval according to the hopping rule.

16. A user equipment, comprising: a processor for processing data, and a memory configured to store data, wherein the memory is configured to store an instruction for implementing a transmission resource determining method, and the processor is configured to execute the instruction stored in the memory, when the processor executes the instruction stored in the memory, executing steps comprising:
  acquiring a hopping rule of a used transmission resource, wherein in the hopping rule, the transmission resource used after a current hopping is associated with identification information used in the latest transmission, and is associated with at least one of: frequency domain information corresponding to a physical resource used in the latest transmission, and time domain information of the latest transmission, wherein the identification information is used to distinguish a plurality of user equipments using the same resource for information transmission; and
  performing a corresponding transmission resource hopping at a preset time interval according to the hopping rule.

17. The user equipment according to claim 16, wherein the frequency domain information corresponding to the physical resource used in the latest transmission comprises a resource unit sequence number used in the latest transmission;
  the time domain information of the latest transmission comprises a sub-frame sequence number at the latest transmission, or a time slot sequence number at the latest transmission, or a symbol sequence number at the latest transmission, or the number of resource hopping times; and
  the identification information used in the latest transmission comprises sequence coding information or power intensity information used in the latest transmission.

18. The user equipment according to claim 17, wherein the sequence coding information comprises pilot sequence information and/or spreading sequence information.

19. The user equipment according to claim 16, wherein the hopping rule comprises at least one of: a function based hopping rule, an orthogonal Latin square based hopping rule, and a Latin square based hopping rule.

20. A storage medium in which a computer-executable instruction is stored, wherein when the computer-executable instruction is executed by a processor, the processor executes the transmission resource determining method of claim 1.

* * * * *

UNITED STATES PATENT AND TRADEMARK OFFICE
CERTIFICATE OF CORRECTION

PATENT NO. : 11,166,297 B2
APPLICATION NO. : 16/497205
DATED : November 2, 2021
INVENTOR(S) : Xun Yang et al.

Page 1 of 1

It is certified that error appears in the above-identified patent and that said Letters Patent is hereby corrected as shown below:

In the Specification

Column 5, Line 25, the formula reading:
- $x_{k,r-1} + x_{k,r}$, -
Should read:
-- $x_{k,r-1} + \Delta x_{k,r}$ --

Column 5, Line 28, the formula reading:
- $\Delta_{k,r}$ -
Should read:
-- $\Delta y_{k,r}$ --

Column 6, Line 7, the formula reading:
- $\mod(y_{k,r-1} + x_{k,r} + \Delta y_{init}, N)$    $w = 1$ -
Should read:
-- $\mod(y_{k,r-1} + x_{k,r} + r + \Delta y_{init}, N)$    $w = 1$ --

Signed and Sealed this
Sixteenth Day of August, 2022

Katherine Kelly Vidal
*Director of the United States Patent and Trademark Office*